United States Patent
Furuta et al.

(10) Patent No.: US 11,370,897 B2
(45) Date of Patent: Jun. 28, 2022

(54) CURABLE COMPOSITION COMPRISING UV STABILIZER

(71) Applicant: Momentive Performance Materials Inc., Waterford, NY (US)

(72) Inventors: Paul Furuta, Halfmoon, NY (US); Andreas Haeuseler, Köln-Ensen (DE); Gunnar Hoffmüller, Odenthal / Neschen (DE)

(73) Assignee: Momentive Performance Materials Inc., Waterford, NY (US)

( * ) Notice: Subject to any disclaimer, the term of this patent is extended or adjusted under 35 U.S.C. 154(b) by 146 days.

(21) Appl. No.: 16/577,493

(22) Filed: Sep. 20, 2019

(65) Prior Publication Data

US 2021/0087355 A1 Mar. 25, 2021

(51) Int. Cl.
*C08K 5/07* (2006.01)
*C08K 3/36* (2006.01)
*C08K 5/00* (2006.01)
*C08L 75/14* (2006.01)

(52) U.S. Cl.
CPC .......... *C08K 5/07* (2013.01); *C08K 3/36* (2013.01); *C08K 5/005* (2013.01); *C08K 5/0025* (2013.01); *C08K 5/0041* (2013.01); *C08L 75/14* (2013.01); *C08L 2312/00* (2013.01)

(58) Field of Classification Search
CPC ........................................................ C08K 5/07
See application file for complete search history.

(56) References Cited

U.S. PATENT DOCUMENTS

| | | |
|---|---|---|
| 4,478,876 A | 10/1984 | Chung |
| 5,318,850 A | 6/1994 | Pickett |
| 5,391,795 A | 2/1995 | Pickett |
| 5,468,789 A | 11/1995 | Lewis |
| 5,869,185 A | 2/1999 | Bahr |
| 5,990,188 A | 11/1999 | Patel |
| 2010/0073754 A1 | 3/2010 | Baumann |
| 2011/0073171 A1 | 3/2011 | Pickett |
| 2012/0248497 A1 | 10/2012 | Zhou et al. |

OTHER PUBLICATIONS

Patent Cooperation Treaty (PCT), International Search Report and Written Opinion for Application PCT/US2020/051147 filed Sep. 17, 2020, dated Nov. 19, 2020, International Searching Authority, EP.

*Primary Examiner* — Wenwen Cai
(74) *Attorney, Agent, or Firm* — McDonald Hopkins LLC

(57) ABSTRACT

The present invention relates to curable compositions comprising at least one compound of the formula (1):

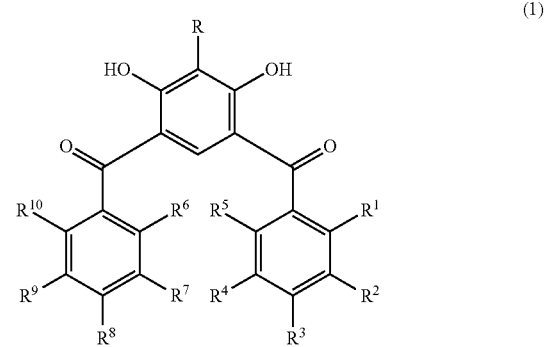

wherein R is C1-C10 alkyl, and $R^1$-$R^{10}$ each are independently selected from the group consisting of hydrogen and C1-C10 alkyl, with the proviso that at least one of $R^1$-$R^{10}$ is alkyl, and wherein the substitution patterns formed by the residues $R^1$-$R^5$ and $R^6$-$R^{10}$ on each of the aromatic rings are different from each other,
cured compositions obtained from such curable compositions, mixtures of compounds of the formula (I), the use of such compounds and mixtures of such compounds as a UV stabilizer in curable compositions, and a process for the manufacture of curable compositions comprising a UV stabilizer of the formula (1).

28 Claims, No Drawings

CURABLE COMPOSITION COMPRISING UV STABILIZER

The present invention relates to curable compositions comprising a certain UV stabilizer compound, mixtures of UV stabilizer compounds and the use of such compound and compound mixtures as UV stabilizers, as well as a process for the production of such curable compositions.

BACKGROUND

Organoplastic resins, film forming materials, and moulded or extruded plastic parts that are coated with traditional protective coatings become colored and brittle and eventually deteriorate when exposed to sunlight. In order to avoid the deleterious and damaging effect of sunlight on plastics and other materials, formulators have included UV stabilizers to minimize these detrimental effects.

Diacyl resorcinol derivatives used as UV absorbers in coatings for exterior use, such as acrylate-based coatings, have been used to attempt to improve weatherability. However, in general the solubility in the coating matrix must be increased to make them compatible with the coating matrix. Diacyl resorcinol derivatives (e.g. dibenzoyl resorcinol, DBR) are commonly not highly soluble in organic matrices, for instance in organic polymer matrices in primer layers for thermally cured hardcoats. U.S. Pat. No. 5,869,185 describes the application of dibenzoyl resorcinol in a PMMA matrix, wherein strong solvents are used to produce the primer and the primer is applied on a polycarbonate panel.

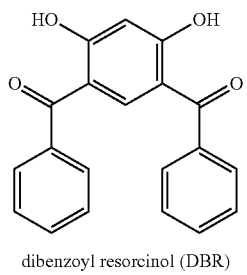 [SMILES: O=C(c1ccccc1)c1cc(C(=O)c2ccccc2)c(O)cc1O]

dibenzoyl resorcinol (DBR)

DBR, as such, is not suitable as a UV absorber in organic acrylate coatings due to its low compatibility with the organic polymer matrix. Although the solubility of DBR in an organic matrix, as for instance in a polymer coating composition, can be increased by adding suitable organic solvents, such as strong alcoholic solvents, this is disadvantageous for the general use of the coating when applied to sensitive polymeric substrates like polycarbonate. Therefore, the use of diacyl resorcinol derivatives, in particular in acrylate based clear coats, is limited. One approach to overcome this problem was to introduce a silane side group to the diacyl resorcinol core to increase the solubility and make it compatible with the coating matrix, for instance for the application of 4,6-dibenzoyl-2-(3-triethoxysilylpropyl) resorcinol (SDBR) (see e.g. U.S. Pat. Nos. 5,990,188 and 5,391,795).

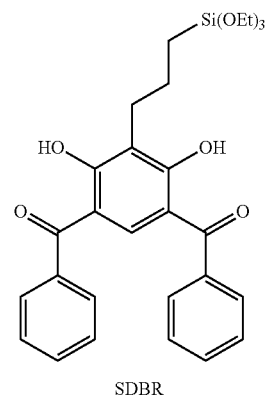

SDBR

However, the introduction of the silane side group to the diacyl resorcinol core has several disadvantages:

the trialkoxysilane side chain is introduced in a multi-step synthesis and thereby decreases the overall yield in the UV absorber synthesis, thus making the silylated diacyl resorcinols expensive, the trialkoxysilane group is sensitive to hydrolysis, the sterically demanding side chain decreases the molar efficiency of the molecule and influences the mechanical properties of the coating matrix by e.g. decreasing the abrasion resistance of the coating layer.

Accordingly, there is still a need for UV absorbers based on a diacyl resorcinol core to increase the solubility of the UV absorber and which would be relatively easy to synthesize.

DETAILED DESCRIPTION OF THE INVENTION

The inventors have surprisingly found that by using mixtures of resorcinol derivatives, the solubility of the mixture in the coating matrix is significantly increased in alcoholic solvents compared to the respective pure/isolated analogues of these resorcinol derivatives. Such mixtures can be obtained in a one-step synthesis starting from 2-alkyl resorcinol and a mixture of an alkylated benzoylchloride and an optionally alkylated benzoylchloride different from the aforementioned alkylated benzoylchloride, which leads to the formation of a statistical mixture of two symmetrical addition products and one unsymmetrical derivative.

Thus, the present invention provides an efficient route to weathering protective coatings using a class of diacyl resorcinol derivative mixtures as UV absorbers. By using low-molecular weight mixtures of diacyl resorcinol derivatives as a UV absorber in a coating matrix, obtained in a one step synthesis, the inefficiency of conventional solutions due to high synthesis costs, low yields in the multi-step manufacturing processes, and the necessary high concentration (mass %) in the coating matrix is solved.

In a first aspect, the invention is directed to curable compositions that are photostable and capable of absorbing ultraviolet light.

The invention specifically relates to a curable composition comprising:

at least one compound of the formula (1):

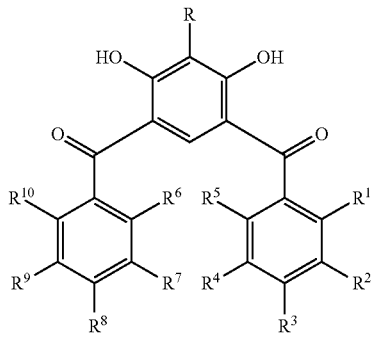

(1)

wherein R is C1-C10 alkyl, and $R^1$-$R^{10}$ each are independently selected from the group consisting of hydrogen and C1-C10 alkyl, with the proviso that at least one of $R^1$-$R^{10}$ is C1-C10 alkyl, and wherein the substitution patterns formed by the residues $R^1$-$R^5$ and $R^6$-$R^{10}$ on each of the aromatic rings are different from each other.

Curable Composition

The curable composition according to the present invention can be any composition capable of being cured, which refers to the toughening or hardening of a polymer material by a cross-linking of polymer chains by a chemical process. The curing process as mentioned before can be effected by heat, radiation, electron beams, or chemical additives, and characteristically entails an increase in viscosity or hardness. The term is also used in case monomers present in a composition bear more than one site for polymerization and polymerization and cross-linking of the monomers occur at the same time. This is for example the case in polyacrylate monomers, which comprise several acrylate moieties serving as sites for polymerization and cross-linking.

Curable Composition-Components and Polymers

Further, the curable compositions according to the invention refer to diverse types of compositions containing various organic polymers, mixtures of organic polymers and monomers, or monomers, for instance all kinds of polycarbonates, poly(meth)acrylates, polyolefins, polyurethanes, polyorganosiloxanes, as well as various copolymers and mixtures of polymer compounds.

Monomers of the Composition

In an embodiment, the curable composition according to the invention preferably comprises at least one acrylic monomer, wherein the term "acrylic monomer" generally includes esters and amides of acrylic acid, methacrylic acid and homologs and analogs thereof, such as ethylacrylic, phenylacrylic or chloroacrylic acid. The preferred acids are acrylic and methacrylic acid, with acrylic acid generally being the most preferred. The acrylic monomers are preferably esters; generally, the terms "acrylate" or "acrylic" as used herein include methacrylates when the corresponding structural formula or chemical name so indicates. Other examples of acrylic monomers which can be used to modify the coating compositions are: dipentaerythritol pentaacrylate, pentaerythritol tetraacrylate, di-trimethylolpropane tetraacrylate, trimethylolpropane triacrylate, pentaerythritol triacrylate, tris(2-hydroxy ethyl) isocyanurate triacrylate, 1,6-hexanediol diacrylate, octanediol diacrylate, decanediol diacrylate, tetrahydrofurfuryl acrylate, octyl/decyl acrylate, isobornyl acrylate, cylohexyl acrylate, N-vinylpyrrolidone, aliphatic urethane acrylate oligomers, and aliphatic polyester acrylate oligomers. Urethane acrylates are especially preferred.

Further preferably, at least a portion of the acrylic ester monomer present in the curable composition is a silyl acrylate, which is used to make silyl acrylate modified colloidal silica. Suitable silyl acrylates include those of the formula

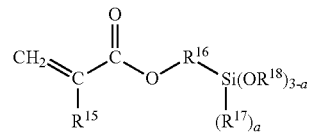

wherein $R^{15}$ is hydrogen or methyl, $R^{16}$ is C1-8 alkylene, $R^{17}$ is C1-13 alkyl or aryl, $R^{18}$ is C1-8 alkyl and a is from 0 to 3. Especially preferred are acrylates wherein $R^{15}$ is methyl, $R^{16}$ is C2-4 alkylene and especially trimethylene, $R^{18}$ is methyl and a is 0.

It is also generally preferred that the curable composition according to the invention comprises at least one polyfunctional acrylic monomer. Such monomers include compounds of the formula

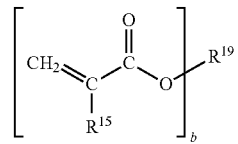

wherein $R^{15}$ is as previously defined and in this instance is preferably hydrogen, $R^{19}$ is a polyvalent organic radical and b is an integer from 2 to 8. The $R^{19}$ radical is most often an aliphatic radical having about 4-20 carbon atoms. Preferably, b is 5-6 and $R^{19}$ is alkylene, especially unbranched alkylene such as tetramethylene, hexamethylene or octamethylene.

Examples of multifunctional acrylic monomers suitable for this invention are dipentaerythritol monohydroxypentaacrylate (DiPePeta, SR-399, Sartomer Co.), hexafunctional polyurethane acrylate (PU, Ebecryl 1290, UCB Radcure Inc.), and hexafunctional polyester acrylate (PE, Ebecryl 830, UBC Radcure Inc.), and dipentaerythritol hexaacrylate.

Photoinitiators of the Composition

The curable composition according to the invention may further comprise one or more photoinitiators for ultraviolet light-induced cure of said composition. Many such photoinitiators are known in the art, and many are suitable for use according to the present invention. The photoinitiator may be chosen from the types disclosed in U.S. Pat. Nos. 4,478,876 and 5,318,850. Further examples include combinations of aromatic ketones such as acetophenone, benzophenone, xanthone, benzoin compounds and the like, tertiary amines such as triethanolamine, methyl diethanolamine, and 4-dimethylaminobenzophenone; acylphosphorus compounds, including triorganobenzoyldiarylphosphine oxides, triorganobenzoyldiorganophosphonates and triorganobenzoyldiarylphosphine sulfides. The acylphosphorus compounds are preferred and, Bis-(2,4,6-trimethylbenzoyl)phenylphosphine oxide is especially preferred, which is vailable as Irgacure® 819 from BASF Corporation. Other photoinitiators are benzoin derivatives (2-benzoyl-2-propanol (Darocur® 1173), 1-hydroxy-cyclohexyl-phenylketone (Irgacure® 184), dimethoxyacetophenone (Irgacure® 651), substituted □-amino ketones (Irgacure® 907), and benzoyl oxime derivatives (Irgacure® OXE 01).

Light Stabilizers of the Composition

The curable composition according to the invention may comprise one or more additional ultraviolet (UV) light stabilizers in addition to the resorcinol derivatives according to the invention, and these light stabilizers are present in an range of 0.2-2.0 weight percent to inhibit ultraviolet degradation of the type leading to microcrack formation, delamination and yellowing, but not effective to substantially inhibit ultraviolet-induced curing of the composition. Hindered amine light stabilizers (HALS) may be any hindered amine light stabilizers known to one skilled in the art that has sufficiently low basicity so as to be compatible with the coating composition matrix. Examples include 2,2,6,6-tetramethlypiperidinyl derivatives Tinuvin 123 (BASF) or Hostavin 3058 (Clariant). Other low basicity HALS are also expected to be effective in the coating compositions of this invention.

Silica Compounds of the Composition

Also preferably, the curable composition according to the invention contains a silica compound used to provide abrasion resistance, which includes silyl acrylate modified silica, with silica having an median particle size (D50), measured by dynamic light scattering (DLS), in the range of about 5-80 nm, corresponding to that of colloidal silica, and especially about 15-30 nm being further preferred. Colloidal silica is a dispersion of submicron-sized silica particles in an aqueous or other solvent medium; silica concentrations therein are typically in the range of about 15-50 weight percent. When an aqueous silica dispersion is employed in the preparation of the composition of the invention, hydrolysis of at least a portion of the Si—O bonds of silyl acrylates optionally present in the composition (when a is less than 3) is possible or even likely. Therefore, the compositions of this invention may include those containing hydrolysis products of said silyl acrylate. An example of silyl acrylate modified colloidal silica is described in the U.S. Pat. No. 5,468,789. Generally, the curable compositions of this invention can include surfactants, leveling agents or mixtures thereof. An example of a surfactant or leveling agent is the silicone hexaacrylate Ebecryl 1360, a product of Allnex.

Solvents of the Composition

The curable composition according to the invention may comprise one or more solvents, wherein the solvent used for these compositions is an organic solvent which dissolves the acrylic polymer, is inert towards the solid substrate, and is readily volatilized. Some non-limiting examples of such solvents include hydroxyethers, alcohols, keto alcohols, liquid aliphatic hydrocarbons, liquid cycloaliphatic hydrocarbons and mixtures thereof. It is further important that the solvent is capable of sufficiently dissolving the compounds of the general formula (I). Alkanols and hydroxyl ethers are particularly preferred solvents according to the invention.

The curable composition according to the invention may also comprise an emulsion of acrylic polymer and water, which further comprises a hydroxyl ether, an alkanol, or a mixture of a hydroxyl ether and an alkanol.

The hydroxyl ethers which are present in these emulsion compositions are compounds represented by the general formula

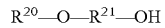

$R^{20}$—O—$R^{21}$—OH wherein $R^{21}$ is a saturated divalent aliphatic radical, preferably one containing from 1 to 6 carbon atoms, and $R^{20}$ is an alkyl radical or an alkoxy alkyl radical containing from 1 to 6 carbon atoms.

The alkanols that may be present in the emulsion composition are those containing usually from 1 to 4 carbon atoms.

Further Additives of the Curable Compositions

In general, curable compositions according to the invention may comprise further additives required for the leveling of polymers and compositions containing polymers during the application process of the coating composition, such as polyethersiloxane-Copolymer surfactants and surface active components (e.g. BYK310 (available from BYK Chemie)) or reactive surfactant and reactive surface active agents like polyethersiloxane-Copolymers bearing one or more reactive (meth)acrylate functionalities (e.g. Tegorad 2100, Tegorad 2200 from Evonik or BYK UV3570 from BYK Chemie).

In general, curable compositions according to the invention may comprise curing catalysts, such as for instance di-tert-butylperoxide (DTBP), dicumyiperoxide (DCP) or 2,2'-Azodi(isobutyronitrile) (AIBN) further additives required for the leveling of polymers and compositions containing polymers during the application process of the coating composition, such as surfactants and surface active components (e.g. BYK310 (available from BYK Chemie)) or reactive surfactant and reactive surface active agents (e.g. Tegorad 2100 from Evonik).

Preferably, the curable compositions according to the invention comprise:
about 27 to about 60 weight-% of acrylate monomers, with aliphatic urethane polyacrylates: about 25 to about 50 weight-%, preferably about 30 to about 40 weight-%, and low viscous aliphatic di- and triacrylates (e.g. HDDA): about 1-10 weight-%, preferably about 2 to about 6 weight-%;
about 1 to about 15 weight-%, preferably about 1 to about 9 weight-%, more preferably about 2 to about 7 weight-% of resorcinol-based UV absorber according to the invention,
0 to about 2 weight-%, preferably about 0.2 to about 0.8 weight-% of further light stabilizer,
0 to about 4 weight-%, preferably about 1 to about 2.5 weight-% photoinitiator:
0 to about 10 weight-%,—preferably about 2 to about 8 weight-%, most—preferably about 2 to about 5 weight-% of a silica component,
about 20 to about 80 weight-%, preferably about 32 to about 70 weight-%, more preferably about 35 to about 60 weight-% of a solvent, and
less than about 1 weight-% of further additives, wherein the weight percentages add up to 100%, based on the total weight of the composition.

According to the invention, the term "curable composition" refers to compositions for the formation of UV-curable and thermocurable hardcoats, particularly preferred of UV-curable hardcoats.

Preparation and Processing of the Curable Composition

The curable compositions according to the invention may be prepared by simply blending the various reagents in the desired proportions. If solvents are present and/or colloidal silica is the source of the silicon compound, volatiles may be removed by conventional operations such as vacuum stripping. The composition may then be applied by conventional techniques such as dipping, brushing, spraying, roller coating or flow coating to the substrate, which is most often a polycarbonate, polyester or an acrylic resin such as poly (methyl) methacrylate). The coating thus formed preferably has a thickness in the range of about 3 to about 25 □m and typically about 8-16 □m. Following application, the composition is cured by exposure to suitable ultraviolet radiation. Curing temperatures are not critical but may be within the range of about 25°-about 70° C. The process may be run as a batch process or a continuous line for coating and curing. The curing products of the curable compositions according to the invention are other aspects of the invention, which are further described below.

Organic Polymer Matrix of the Curable Composition

According to the present invention, the term "organic polymer matrix" is used when referring to any kind of polymeric constituent of the curable compositions according to the invention after curing, wherein one or more kinds of polymers may constitute the organic polymer matrix of a curable composition after curing.

C1-C10 Alkyl Residues of the Compounds of the Curable Composition

C1-C10 alkyl groups according to the invention comprise linear, branched and cyclic alkyl groups, including linear or branched alkyl groups bearing cyclic alkyl groups as substituents and linear or branched alkyl groups containing cyclic alkylene groups in the carbon chain.

In a preferred embodiment, C1-C10 linear alkyl groups are selected from methyl, ethyl, propyl, butyl, pentyl, hexyl and octyl groups, branched alkyl groups are selected from isopropyl, sec-butyl, iso-butyl, tert-butyl, sec-pentyl, iso-pentyl, neo-pentyl, and 2-ethylhexyl groups, and cyclic alkyl groups are selected from cyclopentyl and cyclohexyl groups. These alkyl groups are preferred C1-C10 alkyl groups according to the invention, and particularly preferred alkyl groups are methyl, ethyl and tert-butyl.

In the curable composition according to the invention, preferably R and at least one of $R^1$-$R^5$ or R and at least one of $R^6$-$R^{10}$ are the same type of alkyl group, more preferably R, at least one of $R^1$-$R^5$ and at least one of $R^6$-$R^{10}$ are the same type of alkyl group.

In a preferred embodiment according to the invention, the curable composition comprises at least one compound of the formula (1) wherein R is methyl and $R^1$-$R^{10}$ are each independently selected from the group consisting of hydrogen and C1-C10 alkyl, with the proviso that at least one of $R^1$ to $R^{10}$ is C1-C10 alkyl, preferably one of $R^1$ to $R^{10}$ is C1-C10 alkyl and the remaining $R^1$ to $R^{10}$ groups are hydrogen, and the proviso that the substitution patterns formed by the residues $R^1$-$R^5$ and $R^6$-$R^{10}$ on each of the aromatic rings are different from each other.

Thus, the compound of the formula (1) as described above comprised by the curable composition according to the invention does not have any symmetry plane perpendicular to the plane formed by the C-atoms of the aromatic ring of the resorcinol group, and it does not have any axis of symmetry in the plane formed by the C-atoms of the aromatic ring of the resorcinol group.

In a preferred embodiment according to the invention, the amount of the compounds of formula (1) in the curable composition is in the range from about 1 weight-% to about 15 weight-%, more preferably in the range from about 1 weight-% to about 9 weight-%, most preferably in the range from about 2 weight-% to about 7 weight-% based on the total weight of the curable composition.

In a preferred embodiment according to the invention, the curable composition comprises at least one compound of the formula (1) wherein R is methyl, and R are each independently selected from the group consisting of hydrogen and methyl, with the provisos that at least one of $R^1$ to $R^{10}$ is methyl and that the substitution patterns formed by the residues $R^1$-$R^5$ and $R^6$-$R^{10}$ on each of the aromatic rings are different from each other.

More preferably, one group of $R^1$-$R^{10}$ is methyl and the remaining groups of $R^1$-$R^{10}$ are hydrogen.

In a preferred embodiment according to the invention, at least one compound of the formula (1) is represented by the formula (2):

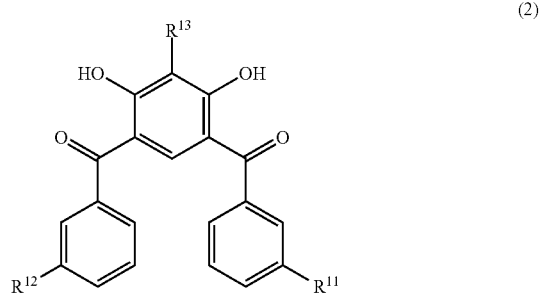

(2)

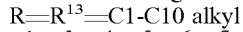

wherein $R^{13}$ is C1-C10 alkyl and $R^{11}$ and $R^{12}$ are selected from hydrogen and C1-C10 alkyl, with the provisos that at least one of $R^{11}$ and $R^{12}$ is C1-C10 alkyl and that $R^{11}$ and $R^{12}$ are different from each other.

Therein, preferably $R^{13}$ and $R^{11}$ or $R^{13}$ and $R^{12}$ represent the same type of C1-C10 alkyl group, more preferably with $R^{11}$=$R^{13}$= same type of C1-C10 alkyl group and $R^{12}$=H, or $R^{12}$=$R^{13}$= same type of C1-C10 alkyl group and $R^{11}$=H.

Also preferably, $R^{13}$ is methyl and at least one of $R^{11}$ and $R^{12}$ is C1-C10 alkyl, more preferably $R^{13}$ is methyl and only one group of $R^{11}$ and $R^{12}$ is C1-C10 alkyl.

It is noted that the structures represented by general formula (2) as defined above are specific structures of the general formula (1) as defined above, wherein the residues of the structure of general formula (1) are set to R=$R^{13}$=C1-C10 alkyl $R^1$, $R^3$, $R^4$, $R^5$, $R^6$, $R^7$, $R^8$ and $R^{10}$ are hydrogen, and $R^2$=$R^{11}$=C1-C10 alkyl or hydrogen and $R^9$=$R^{12}$=C1-C10 alkyl or hydrogen.

The proviso regarding the general formula (2) that $R^{11}$ and $R^{12}$ are different from each other corresponds to the proviso regarding the general formula (1) that the substitution pattern formed by $R^1$-$R^5$ is different from the substitution pattern formed by $R^6$-$R^{10}$.

In general, the at least one compound of the formula (1) or formula (2) according to the invention is a diacyl resorcinol based UV stabilizer compound, which is compatible with the organic polymer matrix of the curable composition after curing.

According to the invention, term "compatibility" refers to the interaction of an organic polymer matrix with the polyaroylresorcinols of formula (1) or (2). Phase separation of the polyaroylresorcinols from the organic polymer matrix would be detected by the visible precipitation of the polyaroylresorcinol in the organic polymer matrix.

From this above definition, there are no limitations arising with respect to the organic polymer matrices that may be employed in the present invention, which preferably are transparent organic polymer matrices, other than that they must be compatible with the above-described polyaroylresorcinols of formula (1) or (2).

Illustrative examples of the organic polymer matrices that may be employed in the present invention include polyurethanes, polycarbonates, polystyrenes, acrylic or methacrylic polymers or copolymers, as well as mixtures thereof. As used herein, acrylic polymers are defined as acrylates, methacrylates as well as copolymers and mixtures thereof.

The most preferred transparent polymer matrices are obtained from curing combinations of polyacrylates bearing up to nine acrylate moieties with an aliphatic or urethane-based backbone and further acrylate monomers with up to three acrylate moieties.

Also included in the term organic polymer matrix are compositions that typically comprise acrylic polymers and organic solvents, as well as emulsions of acrylic polymers and water and acrylic polymer compositions in water. When emulsions are employed, the polybenzoylresorcinols are dispersed therein. Said mixtures of polyaroylresorcinols are obtained by, for example, using a mixture of benzoyl chloride derivatives during a Friedel Crafts acylation of 2-alkyl resorcinols or, as depicted below, in a Fries rearrangement reaction.

Such mixtures include mixtures comprising compounds of formula (1), and specifically mixtures comprising compounds of formula (2). Mixtures of compounds of formula (1) or specifically of formula (2) are also preferred when no emulsion is used.

As defined above, according to the invention at least two aryl rings of the compounds of the formula (1) are substituted with at least one C1-C10 alkyl group, wherein R is mandatorily a C1-C10 alkyl group, and in the same manner at least one of the substituents $R^{11}$ and $R^{12}$ of the compound of the formula (2) is a C1-C10 alkyl group, which provides more hydrophobicity to the molecule. The presence of C1-C10 alkyl groups as described above in the compounds of the formulae (1) and (2) and the thus increased hydrophobicity provided by the presence of the alkyl groups render the compounds more compatible with the matrix of the curable composition in contrast to DBR (dibenzoyl resorcinol), which does not bear an alkyl group on any aryl ring (see structure above).

The compounds of formula (1) or (2) have the effect of helping the curable composition to be a photostable composition and to be capable of absorbing ultraviolet light.

According to the invention, the term "photostable" is defined as displaying weathering resistance against solar irradiation.

Further, according to the invention the term "capable of absorbing ultraviolet light" is understood as the property of a compound to undergo a photochemical reaction cycle to convert violet light into heat under preservation of the chemical structure.

In another preferred embodiment according to the invention, the curable composition comprises at least one compound of the formula (2) wherein $R^{13}$ is methyl and and $R^{12}$ are selected from hydrogen and methyl, with the provisos that at least one of $R^{11}$ and $R^{12}$ is methyl and that $R^{11}$ and $R^{12}$ are different from each other.

In a more preferred embodiment of the invention, the curable composition comprises
at least a compound of the formula (1), wherein R is selected from the group consisting of propyl, ethyl, methyl, and $R^1$-$R^{10}$ are each independently selected from the group consisting of hydrogen, methyl, ethyl and propyl, with the provisos that at least one of $R^1$-$R^{10}$ is selected from the group consisting of methyl, ethyl and propyl and that the substitution patterns formed by the residues $R^1$-$R^5$ and $R^6$-$R^{10}$ on each of the aromatic rings are different from each other, and further
at least one compound of the formula (2), wherein $R^{13}$ is selected from the group consisting of methyl, ethyl and propyl, and $R^{11}$ and $R^{12}$ are each independently selected from the group consisting of hydrogen, methyl, ethyl and propyl, with the provisos that at least one of and $R^{12}$ is selected from the group consisting of methyl, ethyl and propyl and that and $R^{12}$ are different from each other.

In an even more preferred embodiment of the invention, the curable composition comprises
at least a compound of formula (1), wherein R is methyl, and $R^1$-$R^{10}$ are each independently selected from the group consisting of hydrogen and methyl, with the provisos that at least one of $R^1$-$R^{10}$ is methyl and that the substitution patterns formed by the residues $R^1$-$R^5$ and $R^6$-$R^{10}$ on each of the aromatic rings are different from each other, and further
at least one compound of the formula (2) wherein $R^{13}$ is methyl and and $R^{12}$ are selected from hydrogen and methyl groups, with the proviso that at least one of $R^{11}$ and $R^{12}$ is methyl, and that $R^{11}$ and $R^{12}$ are different from each other.

Preferably, the molar ratio of compounds of the formula (2) to compounds of the formula (1) excluding compounds of the formula (2) is about 70:30 to about 30:70, more preferably about 60:40 to about 40 to 60, and even more preferably about 50:50 .

Also preferably, the total amount of the compounds of formula (1) and (2) in the curable composition is up to about 15 weight-%, more preferably in the range from about 1 weight-% to about 9 weight-%, and most preferably in the range from about 2 weight-% to about 7 weight-% based on the total weight of the curable composition.

A further embodiment according to the invention relates to a curable composition comprising a mixture comprising at least one compound of the formula (1) wherein R is C1-C10 alkyl, and $R^1$-$R^{10}$ each are independently selected from the group consisting of hydrogen and C1-C10 alkyl, with the provisos that at least one of $R^1$-$R^{10}$ is C1-C10 alkyl and that the substitution patterns formed by the residues $R^1$-$R^5$ and $R^6$-$R^{10}$ on each of the aromatic rings are different from each other, and at least one compound of the formula (3)

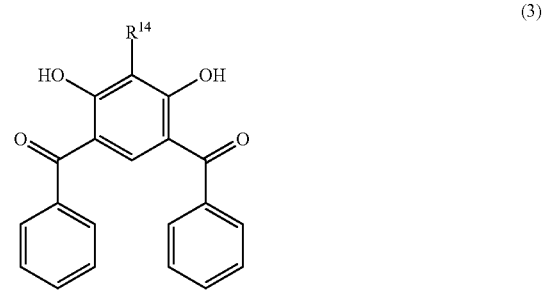

(3)

wherein $R^{14}$ is C1-C10 alkyl, preferably methyl.

Therein, the at least one compound of the formula (1) may be specified as described in each of the above embodiments.

In the structure of formula (3), C1-C10 alkyl is as defined in a general way above.

By combining substituted and unsubstituted 2-alkyl resorcinols, the solubility of the resorcinols present in such mixture in organic solvents is considerably improved when compared to the solubility of the single specific resorcinols constituting such mixtures.

In a preferred embodiment according to the invention, the curable composition comprises a mixture of at least one compound of formula (1), wherein R is methyl and $R^1$-$R^{10}$ are each independently selected from the group consisting of hydrogen and methyl, with the proviso that at least one of $R^1$-$R^{10}$ is methyl and that the substitution patterns formed by the residues $R^1$-$R^5$ and $R^6$-$R^{10}$ on each of the aromatic rings are different from each other, and further at least one compound of the formula (3), wherein $R^{14}$ is C1-C10 alkyl and is preferably selected from the group consisting of methyl, ethyl and butyl, and most preferably $R^{14}$ is methyl.

Preferably, the total amount of the combined compounds of formula (1) and (3) in the curable composition is in the range from about 1 weight-% to about 15 weight-%, more preferably in the range from about 1 weight-% to about 9 weight-%, and most preferably in the range from about 2 weight-% to about 7 weight-% based on the total weight of the curable composition.

Also preferably, the molar ratio of compounds of the formula (3) to compounds of the formula (1) is about 1:10 to about 1:1, more preferably about 1:8 to about 1:2.5, and even more preferably about 1:5 to about 1:3.

A further preferred embodiment according to the invention relates to a curable composition comprising a mixture comprising at least one compound of the formula (2)

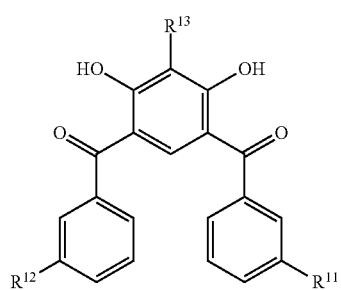

(2)

wherein $R^{13}$ is C1-C10 alkyl and $R^{11}$ and $R^{12}$ are selected from hydrogen and C1-C10 alkyl, with the provisos that at least one of $R^{11}$ and $R^{12}$ is C1-C10 alkyl and that $R^{11}$ and $R^{12}$ are different from each other, and at least one compound of formula (3)

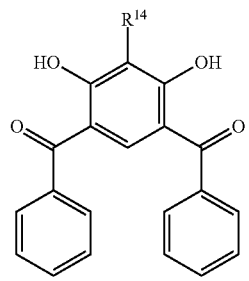

(3)

wherein $R^{14}$ is C1-C10 alkyl, preferably methyl.

A further preferred embodiment according to the invention relates to a curable composition of the invention comprising at least one compound of the formula (2) wherein $R^{13}$ is selected from the group consisting of methyl, ethyl or propyl, and wherein $R^{11}$ and $R^{12}$ are selected from hydrogen, methyl, ethyl and propyl, with the provisos that at least one of $R^{11}$ and $R^{12}$ is selected from a methyl, ethyl or propyl group and that $R^{11}$ and $R^{12}$ are different from each other, and further comprising at least one compound of formula (3) wherein $R^{14}$ is selected from the group consisting of methyl, ethyl and propyl.

An even more preferred embodiment according to the invention relates to a curable composition comprising a mixture comprising at least one compound of the formula (2) wherein $R^{13}$ is methyl and $R^{11}$ and $R^{12}$ are selected from hydrogen and C1-C10 alkyl, with the provisos that at least one of $R^{11}$ and $R^{12}$ is C1-C10 alkyl and $R^{11}$ and $R^{12}$ are different from each other, and at least one compound of the formula (3), wherein $R^{14}$ is methyl.

In a further preferred embodiment according to the invention, the curable composition comprises a mixture comprising at least one compound of the formula (2) and at least one compound of formula (3), wherein $R^{13}$ and $R^{14}$ are methyl, and $R^{11}$ and $R^{12}$ are selected from hydrogen and methyl, with the provisos that at least one of $R^{11}$ and $R^{12}$ is methyl and $R^{14}$ and $R^{12}$ are different from each other.

The compounds of the general formulae (2) and (3) bearing a methyl group or methyl groups, respectively, are less expensive to produce than the analogous compounds bearing the corresponding C2-C10 alkyl groups, e.g. ethyl, propyl or tert-butyl groups, and are thus beneficial from an industrial point of view.

In general, it is preferable when the molar ratio of compounds of the formula (2) with $R^{12}$ being different from $R^{11}$ to compounds of the formula (3) is in the range from about 90:10 to about 50:50, more preferable in the range from about 85:15 to about 60:40, even more preferable from about 80:20 to about 70:30, and it is most preferable when the molar ratio is in the range from about 77:23 to about 73:27.

In another preferred embodiment according to the invention, the curable composition further comprises at least one compound of the formula (1) with R being C1-C10 alkyl, $R^1$-$R^{10}$ being each independently selected from the group consisting of hydrogen and C1-C10 alkyl and with the provisos that at least two groups of $R^1$-$R^{10}$ are C1-C10 alkyl groups and that the substitution patterns formed by the residues $R^1$-$R^5$ and $R^6$-$R^{10}$ on each of the aromatic rings are the same, and preferably R is methyl and $R^1$-$R^{10}$ are selected from the group consisting of hydrogen and methyl.

Preferably, the further comprised compound of the formula (1) as described above is a compound of the general formula (2) with $R^{13}$ being C1-C10 alkyl and $R^{11}$ and $R^{12}$ being selected from C1-C10 alkyl, with the proviso that $R^{11}$ and $R^{12}$ are the same, and preferably $R^{13}$, $R^{11}$ and $R^{12}$ are methyl.

In a very preferred embodiment according to the invention, the curable composition comprises dibenzoylacyl-2-methyl resorcinol (DBMR)

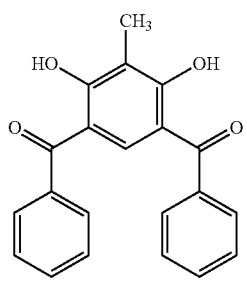

benzoyltoluoylacyl-2-methyl resorcinol (BTMR)

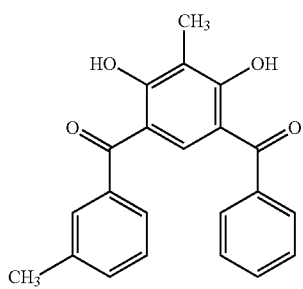

and ditoluoylacyl-2-methyl resorcinol (DTMR)

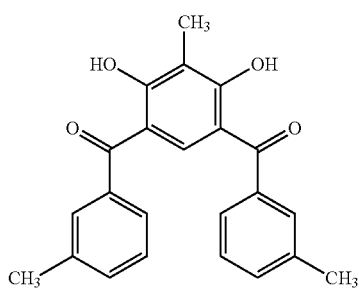

, and preferably the molar amount of each of DBMR and DTMR relative to the molar amount of BTMR, which is set to 2, is independently in the range of preferably 0.1 to 2.5, more preferably 0.2 to 2, even more preferably 0.5 to 1.5, and most preferably 0.75 to 1.25.

While all of the above-listed compounds DBMR, DTMR and BTMR display UV stabilizing properties, their application as pure compounds as UV stabilizers in curable coating compositions is hampered by low solubility and thus low compatibility with the organic matrix of the coating composition. By application as a mixture, preferably in a ratio as described above, solubility of the compounds in the coating composition and accordingly compatibility with the coating matrix is improved.

In a preferred embodiment according to the invention, the curable composition is selected from a photocurable or a heat-curable composition.

According to the invention, a photocurable composition is a composition which can be cured by photoinduced curing of a monomeric, oligomeric, or polymeric substrate using light, mostly ultraviolet light (UV). Examples of photocurable compositions according to the invention are combinations and mixtures of monomeric and oligomeric (meth) acrylates bearing up to nine (meth)acrylate groups. Particularly preferred compositions are photocurable compositions forming hardcoats upon UV-curing, such as hardcoats based on polyacrylate monomers.

In general, the photocurable compositions according to the invention may contain one or more photosensitizers or photoinitiators required for the photocuring of the composition, and the photocurable compositions according to the invention may contain one or more photoactivatable curing catalysts.

For the curing of the photocurable compositions, in most cases lamps emitting light in the visible spectrum having a wavelength of about 380 nm to about 740 nm or UV lamps emitting UV light having a wavelength of about 210 to about 380 nm, more preferably UV lamps, are applied. Sources of UV light typically applied for curing are mercury vapor lamps, mercury vapor lamps with iron or gallium additives, fluorescent lamps and UV LEDs.

According to the invention, a heat-curable composition is a composition which can be cured by applying high temperatures, thus effecting polymerization and/or cross-linking of monomers and polymers present in the curable composition. Examples of heat-curable compositions according to the invention are combinations of (meth)acrylate monomers and poly(meth)acrylate oligomers.

In order to enable heat-curing, the presence of one or more thermal initiators, e.g. diorganoperoxides, may be required in the curable composition.

Preferably, the curable composition according to the invention is a photo-curable composition, even more preferably an UV-curable composition.

In a further preferred embodiment according to the invention, the curable composition is a polymerizable composition.

According to the invention, the term "polymerizable composition" applies to every composition containing monomers capable of forming a polymer. Herein, a polymer is understood to be a substance composed of macromolecules, the macromolecules consisting of multiple repeating units. Therein, the repeating units may be derived from one kind of monomer or several kinds of monomers, thus forming copolymers, and in case more than one kind of repeating unit is present in the polymer, the monomer arrangement displayed by the repeating units may be alternating, arranged in a periodic sequence, blockwise, in a random or statistical arrangement. The term "polymer" explicitly comprises polymers which require the presence of several compounds for polymerization, as for instance compositions containing polyisocyanates and polyols, or compositions comprising dihydroxy compounds and phosgene or dimethylcarbonate for the formation of polycarbonates.

The term "polymerizable composition" according to the invention does not impose any restriction to the type of polymerization by which polymerization of the monomers occurs, as for instance radical polymerization, anionic polymerization or cationic polymerization. The term explicitly comprises compositions which can be polymerized by polycondensation or polyaddition reactions. The monomers may be small molecules having a relative molecular mass below about 1000 g/mol, but the polymerizable molecules may also be oligomers having active polymerization sites, or preformed macromers.

Examples of polymerizable compositions are compositions comprising C—C-unsaturated compounds, in particular compounds containing C—C double bounds, such as acrylates, and compositions comprising polyisocyanates.

Preferred polymerisable compositions according to the invention are aliphatic mono-acrylates, diacrylates or triacrylates as well as aliphatic acrylate oligomers bearing up to nine acrylate moieties, either alone or in combination.

In another preferred embodiment according to the invention, the curable composition comprises at least one curable monomer.

According to the invention, the term "curable monomer" refers to any monomer that enables polymerisation involving said monomers in a chain reaction, wherein the formed polymeric material is typically toughened or hardened by the cross-linking process. In most cases, this requires the presence of one or more active sites for cross-linking, as for instance C—C double bonds, hydroxyl groups, amino groups, thiol groups, epoxy groups, isocyanate groups, or alkoxysilyl groups in the molecule of the curable monomer, which is still present after a single polymerization reaction involving the curable monomer.

In general, the curable monomer may be curable by heat, radiation, in particular by UV light, by the addition of additives, curing catalysts or combinations thereof.

Curable monomers preferably comprised by the curable composition according to the invention are curable C—C unsaturated monomers, like (meth)acrylate monomers, vinyl or allyl monomers.

In a further preferred embodiment according to the invention, the curable composition comprises at least one curable acrylate monomer.

According to the invention, the term "curable acrylate monomer" applies to any curable monomers as defined above being acrylate monomers. Acrylate monomers are salts, esters, and conjugate bases of acrylic acid and its derivatives, as for instance acrylic acid amides, and compounds additionally substituted at one or both of the vinylic C-atoms. Preferred curable acrylate monomers are polyacrylates, i.e. diacrylates, triacrylates, tetraacrylates, pentaacrylates and hexaacrylates, in particular such polyacrylates having an aliphatic or urethane-based backbone.

Preferred curable acrylate monomers according to the invention are 1,6-hexandioldiacrylate (HDDA), decanediol diacrylate, tripropylene glycol diacrylate (TPGDA), trimethylol-propantriacrylate (TMPTA), hydroxylpivalicneopentylglycoldiacrylate (HPNDA), tricyclodecanedimethanol diacrylate (TCDDA), Pentaerythritol triacrylate (PETIA).

In an even further preferred embodiment according to the invention, the curable composition comprises at least one curable aliphatic polyurethane acrylate monomer.

According to the invention, the term "curable aliphatic polyurethane acrylate monomer" refers to any curable monomer as defined above which at the same time comprises one or more polyurethane moieties.

Preferred curable aliphatic polyurethane acrylate monomers according to the invention are for instance the hexafunctional Ebecryl 1290, Ebecryl 8254, the difunctional Ebecryl 8402 or nonafunctional Ebecryl 8602 supplied by Allnex.

The present invention is also directed at a cured composition obtained by curing the curable composition according to the invention as described in the previous embodiments.

According to the invention, the cured composition may be obtained by any means of curing suitable for curing the curable composition according to the invention, which may require mixing the curable composition with a chemical curing agent. Accordingly, the cured composition according to the invention may be obtained by curing induced by electron beam irradiation, induced by photo-irradiation, induced by heating, or by mixing with a curing agent, including moisture, sulfur, organic peroxides and other radical initiators.

Preferably, the cured composition is obtained by photo-cure, i.e. the curing of the curable composition is induced by photo-irradiation, or the cured composition is obtained by thermal curing, i.e. the curing is induced by heating. More preferably, the cured composition is obtained by photo-cure, in particular by UV-cure.

In a preferred embodiment according to the invention, the cured composition as described in any of the above embodiments is obtained as a primer coating, a hardcoat or topcoat on a solid substrate.

The curable compositions according to the invention are applied to the surface of a solid substrate as a coating or hardcoat, thus producing a coated solid substrate having improved resistances to abrasion and especially ultraviolet light. Such coated solid substrates are often referred to as weatherable substrates. Further, there are no limitations with respect to the thickness of the hardcoats applied to the said solid substrates. They are, however, often about 0.5 to about 50 µm thick and preferably about 3 to about 20 µm thick.

The solid substrates that may be employed generally include polymer substrates such as acrylic polymers including poly(methyl methacrylate), polyesters such as poly (ethylene terephthalate) and poly(butylene terephthalate), polyamides, polyimides, acrylonitrile-styrene copolymers, styrene-acrylonitrile-butadiene copolymers, polyvinyl chloride, polystyrene, blends of polystyrene and polyphenylene ethers, butyrates, polyethylene, and the like. Moreover, said solid substrates may also include metal substrates, painted surfaces, glass, ceramics and textiles. Thermoplastic substrates can be with or without pigments.

However, the curable compositions of the present invention are preferably employed to coat polycarbonates. The polycarbonates (homopolycarbonates or copolycarbonates) employed in the present invention may be prepared by reacting bisphenols with a carbonate source such as phosgene or dimethyl carbonate using conventional techniques. These include melt polymerization, interfacial polymerization and interfacial conversion with bischloroformate followed by polymerization. Chain termination agents such as phenol may also be employed.

The curable compositions according to the invention may be applied to solid substrates such as polycarbonates by conventional techniques which include dipping, brushing, roller coating, flow coating or digital ink-jet printing.

Following application, the curable compositions as described above are cured by exposure to ultraviolet light sources, like medium or high pressure Hg lamps with a power of 80 W/cm up to 40 W/cm.

The present invention also relates to a mixture of compounds comprising
A) at least one compound of formula (1), wherein R is C1-C10 alkyl, and $R^1$-$R^{10}$ each are independently selected from the group consisting of hydrogen and C1-C10 alkyl, with the proviso that at least one of $R^1$-$R^{10}$ is C1-C10 alkyl and wherein the substitution patterns formed by the residues $R^1$-$R^5$ and $R^6$-$R^{10}$ on each of the aromatic rings are different from each other, and
B) at least one compound of the formula (1), wherein R is C1-C10 alkyl, and $R^1$-$R^{10}$ are each independently selected from the group consisting of hydrogen and C1-C10 alkyl, wherein the substitution patterns formed by the residues $R^1$-$R^5$ and $R^6$-$R^{10}$ on each of the aromatic rings are the same.

It is generally preferred when a mixture of compounds according to the invention comprises a mixture of 2-alkyl diaroyl resorcinols according to formula (1), wherein R and $R^1R^{10}$ can be C1-C10 alkyl or hydrogen, which is obtained from the Lewis-acid catalyzed reaction of a 2-alkyl resorcinol and two different aryloyl halides (A-X and B-X, wherein A and B represent the different aroyl moieties, and X represents a halide residue). Therein, A-X and B-X are both alkylated aroyl halides or one of A-X and B-X is a benzoyl halide. It is preferred that when the molar amount of the 2-alkyl resorcinol resulting from above-described reaction bearing each one aryloyl substituent A and B ("AB") is set to 2, the values of the 2-alkyl resorcinols bearing the substituent combinations AA and BB in the molar ratio AA:AB:BB found in the mixture according to the invention are in the range from about 0.1 to about 2.5, more preferably about 0.2 to about 2, even more preferably about 0.5 to about 1.5, and most preferably about 0.75 to about 1.25, wherein the values of the molar amounts of AA and BB are independent from each other.

The relative amounts of the 2-alkyl resorcinols having the aryloyl substitution patterns AA, AB and BB, for instance DBMR, BTMR and DTMR, present in the mixtures according to the invention are determined by means of $^1$H-NMR or $^{13}$C-NMR, optionally using an internal standard as reference. Such procedures are known to the person skilled in the art.

The reaction leading to the acyl-resorcinol-based mixture according to the invention is preferably performed in the presence of a Lewis acid catalyst.

According to the invention, any Lewis acid, i.e. any chemical species which contains an empty orbital which is capable of accepting an electron pair from a Lewis base to form a Lewis adduct, is considered a Lewis acid catalyst according to the invention. Preferred Lewis acid catalysts are aluminium halides, e.g. aluminium chloride, boron halides, e.g. boron trifluoride, bismuth triflate and zinc halides. $ZnCl_2$ is a particularly preferred Lewis acid catalyst.

In a preferred embodiment according to the invention, the curable composition as defined in the embodiments above comprises thus obtainable mixture of the previously described embodiment containing 2-alkyl resorcinols having the substitution patterns AA and BB, under the proviso that the molar amount of the likewise included 2-alkyl resorcinol of the substitution pattern AB is set to 2, in molar amounts preferably in the range from about 0.1 to about 2.5, more preferably in the range from about 0.2 to about 2, even more preferably about 0.5 to about 1.5, and most preferably about 0.75 to about 1.25, wherein the values for resorcinols with the substitution pattern AA and for resorcinols with the substitution pattern BB are independent from each other.

In a further preferred embodiment, the present invention relates to a mixture comprising A) at least one compound of formula (1), wherein R is C1-C10 alkyl, and $R^1R^{10}$ each are independently selected from the group consisting of hydrogen and C1-C10 alkyl, with the proviso that at least one of $R^1$-$R^{10}$ is alkyl and wherein the substitution patterns formed by the residues $R^1$-$R^5$ and $R^6$-$R^{10}$ on each of the aromatic rings are different from each other, and B) at least one compound of formula (3):

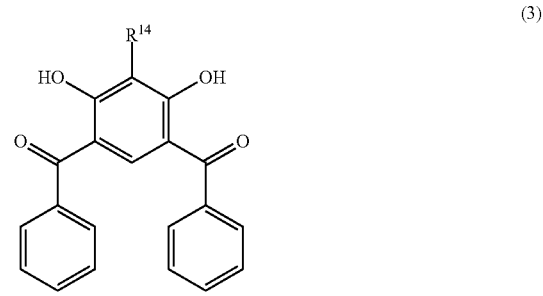

(3)

wherein $R^{14}$ is C1-C10 alkyl, preferably methyl, and

C) preferably at least one further compound of the formula (1), wherein R is C1-C10 alkyl, and $R^1$-$R^{10}$ are each independently selected from the group consisting of hydrogen and C1-C10 alkyl, wherein the substitution patterns formed by the residues $R^1$-$R^5$ and $R^6$-$R^{10}$ on each of the aromatic rings are the same and at least two groups of R1-R10 are C1-C10 alkyl.

It is generally preferred that the molar ratio of compounds according to formula (1), and in particular according to formula (3), which have the same substitution pattern at each of the aroyl groups to the compounds according to formula (1) having different substitution patterns at each of the aroyl groups, in the mixture according to the invention is in the range from about 90:10 to about 10:90, more preferably in the range from about 75:25 to about 25:75, even more preferably in the range from about 60:40 to about 40:60, and most preferably in the range from about 55:45 to about 45:55.

A preferred mixture according to the invention is obtained in a one-step synthesis reaction by mixing 1 equivalent of 2-methyl resorcinol and a mixture of 1 equivalent of benzoyl chloride and 1 equivalent of toluoyl chloride in the presence of zinc dichloride ($ZnCl_2$). The above-mentioned one-step synthesis reaction can be represented as follows:

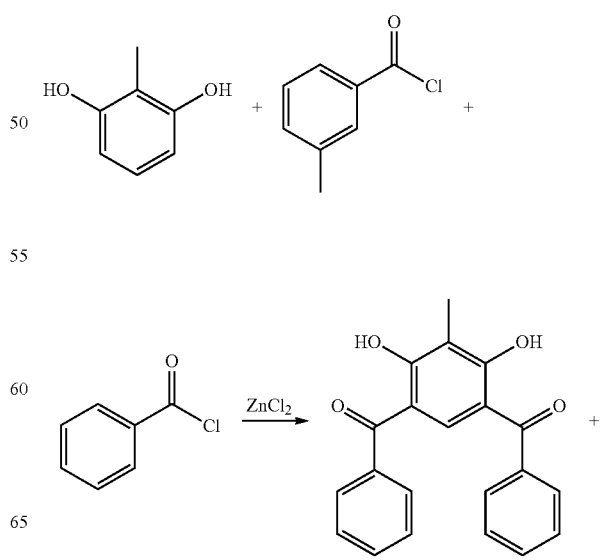

-continued

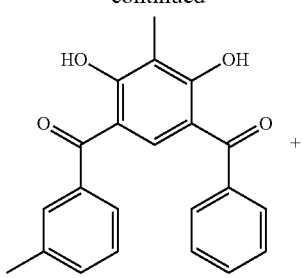

+ and
ditoluoylacyl-2-methyl resorcinol (DTMR)

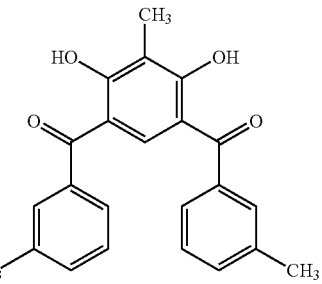

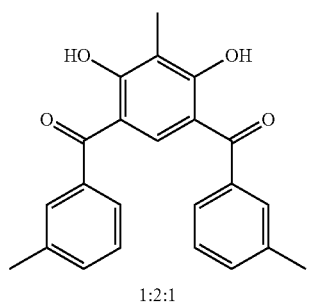

1:2:1

In the reaction shown above, esterification of the OH groups of the 2-methyl resorcinol by the chloro acyl groups of benzoyl chloride and toluoyl chloride occurs, followed by a Lewis acid-catalyzed Fries rearrangement, thus enabling the preparation of acyl phenols.

The above-shown one-step synthesis reaction according to the invention leads to the formation of three products:

dibenzoylacyl-2-methyl resorcinol (DBMR)

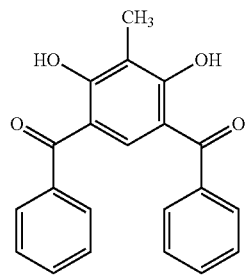

benzoyltoluoylacyl-2-methyl resorcinol (B TMR)

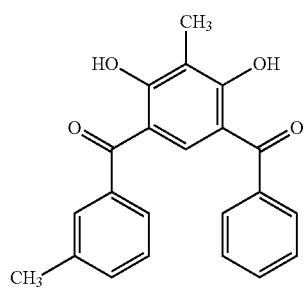

Thus obtained acyl-resorcinol-based mixture according to the invention has a molar ratio of DBMR:BTMR:DTMR of 1:2:1.

This mixture is a particularly preferred mixture of compounds according to the invention.

In general, the term "BTMR" herein applies to benzoyltoluoyl 2-methylresorcinol as single compound, while the terms "BTMR mix" or "BTMR mixture" apply to a mixture of DBMR, BTMR and DTMR, in particular to such mixture wherein BTMR is the main component with regards to the molar ratio of the three components.

Depending on the reaction conditions chosen and in particular in case the crude product is purified by recrystallization, the molar ratio of DBMR:BTMR:DTMR in the purified product may deviate from the expected molar ratio of 1:2:1.

Accordingly, when the molar amount of BTMR is set to 2, the amounts of DBMR and DTMR in the ratio of DBMR:BTMR:DTMR in the mixture according to the invention are preferably in the range from 0.1 to 2.5, more preferably 0.2 to 2, even more preferably 0.5 to 1.5, and most preferably 0.75 to 1.25, wherein the values for DBMR and DTMR are independent from each other.

By using a mixture of resorcinol derivatives, the solubility of this mixture in alcoholic solvents is significantly increased in comparison to the pure resorcinols, e.g. of pure DBR, DBMR or DTMR in comparison to a mixture of the three compounds.

Consequently, in a preferred embodiment according to the invention, the curable composition as defined in the embodiments above comprises thus obtained mixture containing DBMR and DTMR, under the proviso that the molar amount of BTMR is set to 2, with molar amounts of each DBMR and DTMR preferably in the range from 0.1 to 2.5, more preferably in the range from 0.2 to 2, even more preferably 0.5 to 1.5, and most preferably 0.75 to 1.25, wherein the values for DBMR and DTMR are independent from each other.

The above-described procedure for obtaining such mixture of DBMR, BTMR and DTMR in a one-step synthesis starting from 2-methyl resorcinol and a mixture of benzoyl and toluoyl chloride, which yields a statistical mixture of two symmetrical addition products and one unsymmetrical derivative, exemplifies a general procedure for obtaining mixtures according to the invention of one compound of formula (1), wherein R is C1-C10 alkyl, and $R^1$-$R^{10}$ each are independently selected from the group consisting of hydrogen and C1-C10 alkyl, with the proviso that at least one of $R^1$-$R^{10}$ is alkyl and wherein the substitution patterns formed by the residues $R^1$-$R^5$ and $R^6$-$R^{10}$ on each of the aromatic rings are different from each other, and two different compounds of the formula (1), wherein R is C1-C10 alkyl, and $R^1$-$R^{10}$ each are independently selected from the group consisting of hydrogen and C1-C10 alkyl, wherein the substitution patterns formed by the residues $R^1$-$R^5$ and $R^6$-$R^{10}$ on each of the aromatic rings are the same. The mixture can be obtained by performing the reaction with a 2-(C1-C10-alkyl)-resorcinol, one type of an aroyl halide bearing the substituents $R^1$-$R^5$ as defined above and another type of an aryloyl halide bearing the substituents $R^6$-$R^{10}$ as defined above.

In this manner, also the preferred mixture according to the invention of one compound of formula (3), wherein $R^{14}$ is C1-C10 alkyl, and two compounds of formula (2), wherein in one compound of the formula (2) one group selected from $R^{11}$ and $R^{12}$ is C1-C10 alkyl and the other group is hydrogen, and in the other compound of the formula (2) $R^{11}$ and $R^{12}$ are both C1-C10 alkyl groups, can be obtained.

Herein, it is further preferred that the $R^{11}$ and $R^{12}$ groups are, if they are C1-C10 alkyl groups, the same type of C1-C10 alkyl group. Further preferably, the $R^{14}$ group is also the same type of C1-C10 alkyl group, or $R^{14}$ is independently from $R^{11}$ and $R^{12}$ a methyl group.

In a very preferred embodiment according to the invention, the invention relates to a mixture comprising
dibenzoylacyl-2-methyl resorcinol (DBMR)

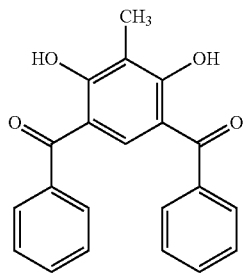 [SMILES: Cc1c(O)c(C(=O)c2ccccc2)cc(C(=O)c2ccccc2)c1O]

benzoyltoluoylacyl-2-methyl resorcinol (BTMR)

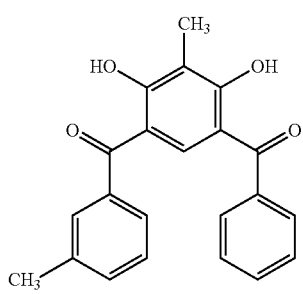 [SMILES: Cc1cccc(C(=O)c2cc(C(=O)c3ccccc3)c(O)c(C)c2O)c1]

and ditoluoylacyl-2-methyl resorcinol (DTMR),

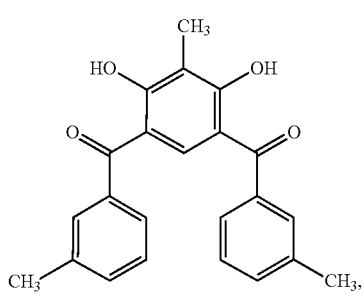 [SMILES: Cc1cccc(C(=O)c2cc(C(=O)c3cccc(C)c3)c(O)c(C)c2O)c1]

wherein preferably the molar amount of each of DBMR and DTMR relative to the molar amount of BTMR, which is set to 2, is independently in the range of preferably 0.1 to 2.5, more preferably 0.2 to 2, even more preferably 0.5 to 1.5, and most preferably 0.75 to 1.25.

In an even more preferred embodiment according to the invention, the invention relates to a mixture consisting of DBMR, BTMR and DTMR, wherein the molar amount of each of DBMR and DTMR relative to the molar amount of BTMR, which is set to 2, is independently in the range of preferably 0.1 to 2.5, more preferably 0.2 to 2, even more preferably 0.5 to 1.5, and most preferably 0.75 to 1.25.

The invention also relates to the use of any of the compounds as described in the previous embodiments according to the invention, or to the use of any of the mixtures of compounds as described in the previous embodiments according to the invention, as a UV stabilizer in curable compositions.

The use of such compounds or mixtures of compounds in curable compositions according to the invention can help to improve the long term stability of coatings, in particular under outdoor conditions, because unlike for the prior art UV absorber SDBR, higher concentrations of compounds and mixtures as described being present in the curable compositions according to the invention are accepted by coating systems without harming the scratch and adhesion properties, and improve the weathering conditions, especially at lower coating thickness.

The invention further relates to a process for the manufacture of a curable composition comprising resorcinol-based UV stabilizers as described above.

In a preferred embodiment according to the invention, a process for the manufacture of a curable composition according to any of the above-described embodiments is provided, comprising the steps of
I) providing a UV stabilizing component consisting of one or more compounds of the formula (1):

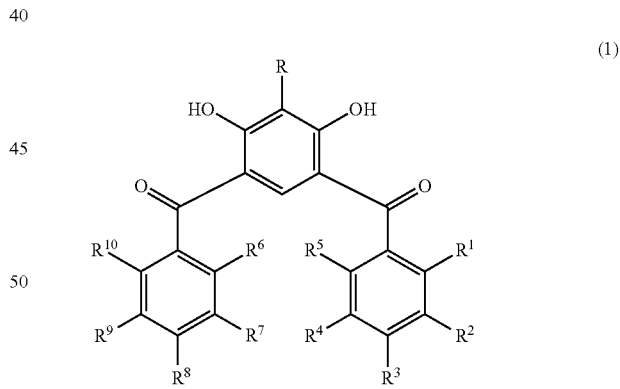

wherein R is C1-C10 alkyl, and $R^1$-$R^{10}$ each are independently selected from the group consisting of hydrogen and C1-C10 alkyl, with the proviso that at least one of $R^1$-$R^{10}$ is C1-C10 alkyl, and wherein the substitution patterns formed by the residues $R^1$-$R^5$ and $R^6$-$R^{10}$ on each of the aromatic rings are different from each other, and optionally one or more compounds of the general formula (1) wherein R is C1-C10 alkyl, and $R^1$-$R^{10}$ are each independently selected from the group consisting of hydrogen and C1-C10 alkyl, and wherein the substitution patterns formed by the residues $R^1$-$R^5$ and $R^6$-$R^{10}$ on each of the aromatic rings are the same, and II) mixing the UV stabilizing component provided in step I) with a composition-forming component comprising
a) one or more curable organic monomers, curable organic polymers or curable mixtures of organic monomers and organic polymers, and
b) optionally one or more photoinitiators,
c) optionally one or more further light stabilizers
d) optionally one or more silica compounds
e) optionally one or more solvents
f) optionally one or more further additives such as leveling agents, surfactants and surface active compounds and curing catalysts, dyes and colorants.

In a further preferred embodiment according to the invention, in the process according to the invention at least one compound of the formula (1) is represented by the formula (2):

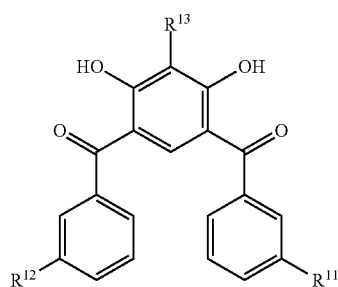

(2)

wherein $R^{13}$ is C1-C10 alkyl and $R^{14}$ and $R^{12}$ are selected from hydrogen and C1-C10 alkyl, with the provisos that at least one of $R^{11}$ and $R^{12}$ is C1-C10 alkyl and that $R^{11}$ and $R^{12}$ are different from each other, preferably wherein $R^{13}$ is methyl, and $R^{11}$ and $R^{12}$ are selected from hydrogen and methyl.

In an even further preferred embodiment according to the invention, a process for the manufacture of a curable composition is provided wherein the UV stabilizing component consists of a mixture of one or more compounds of the formula (2):

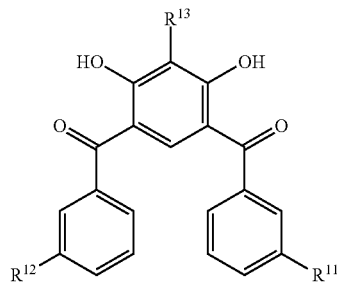

(2)

wherein $R^{13}$ is C1-C10 alkyl and $R^{11}$ and $R^{12}$ are selected from hydrogen and C1-C10 alkyl, with the provisos that at least one of $R^{11}$ and $R^{12}$ is C1-C10 alkyl and that $R^{11}$ and $R^{12}$ are different from each other,
one or more compounds of the formula (2), wherein $R^{13}$ is C1-C10 alkyl and $R^{11}$ and $R^{12}$ are selected from C1-C10 alkyl, with the proviso that $R^{11}$ and $R^{12}$ are the same, preferably methyl, and one or more compounds of formula (3):

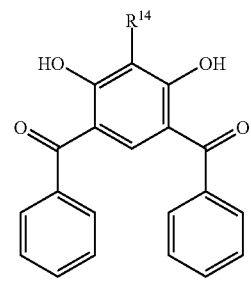

(3)

wherein $R^{14}$ is C1-C10 alkyl, preferably methyl.

In a very preferred embodiment according to the invention, in the process for the manufacture of a curable composition according to the invention the UV stabilizing component consists of a mixture of dibenzoylacyl-2-methyl resorcinol (DBMR)

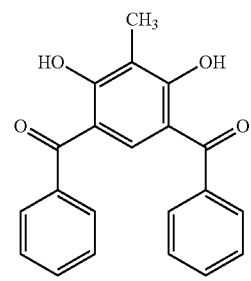 [SMILES: Cc1c(O)c(C(=O)c2ccccc2)cc(C(=O)c2ccccc2)c1O]

benzoyltoluoylacyl-2-methyl resorcinol (BTMR)

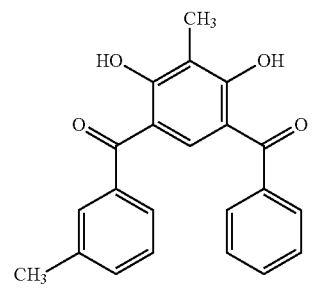 [SMILES: Cc1cccc(C(=O)c2cc(C(=O)c3ccccc3)c(O)c(C)c2O)c1]

and ditoluoylacyl-2-methyl resorcinol (DTMR)

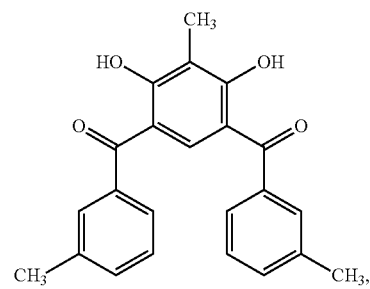 [SMILES: Cc1cccc(C(=O)c2cc(C(=O)c3cccc(C)c3)c(O)c(C)c2O)c1]

preferably the molar amount of each of DBMR and DTMR relative to the molar amount of BTMR, which is set to 2, is independently in the range of preferably 0.1 to 2.5, more preferably 0.2 to 2, even more preferably 0.5 to 1.5, and most preferably 0.75 to 1.25.

In another preferred embodiment according to the invention, in the process according the invention the UV stabilizing component is provided by the reaction of a 2-(C1-C10 alkyl) resorcinol and at least two different aroyl halides of the general structure (4)

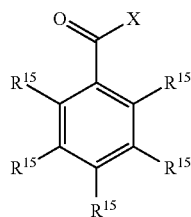
(4)

with X=Cl, Br
and $R^{15}$ is each independently selected from hydrogen or C1-C10 alkyl, optionally followed by a purification step, preferably by recrystallization.

Preferably, therein two aryloyl halides of the general structure (4) are reacted with a 2-(C1-C10 alkyl) resorcinol, with each $R^{15}$ being hydrogen for the first aryloyl halide and one $R^{15}$ of the second aryloyl being C1-C10 alkyl, preferably methyl, and the remaining $R^{15}$ groups of the second aryloyl halide being hydrogen.

In another preferred embodiment according to the invention, in the process according the invention the UV stabilizing component consists of about 1 to about 15 weight-%, preferably about 1 to about 9 weight-%, more preferably about 2 to about 7 weight-% of resorcinol-based UV absorber according to the invention, and the composition-forming component comprises a) about 27 to 60 weight-% of one or more curable organic monomers, curable organic polymers or curable mixtures of organic monomers and organic polymers, preferably about 27 to about 60 weight-% of acrylate monomers, more preferably with about 25 to about 50 weight-% aliphatic urethane polyacrylates and about 1 to 10 weight-% low viscous aliphatic di- and triacrylates (e.g. HDDA), and most preferably with about 30 to about 40 weight-% aliphatic urethane polyacrylates and about 2 to about 6 weight-% low viscous aliphatic di- and triacrylates (e.g. HDDA), b) 0 to about 5 weight-%, preferably about 1 to about 4 weight-%, more preferably about 1 to about 2.5 weight-% of one or more photoinitiators, c) 0 to about 2 weight-%, preferably about 0.2 to about 0.8 weight-% of one or more further light stabilizers, d) 0 to about 10 weight-%, preferably about 2 to about 8 weight-%, more preferably about 2 to about 5 weight-% of one or more silica compounds, e) 0 to about 80 weight-%, preferably 20 to about 80 weight-%, more preferably about 32 to about 70 weight-%, more preferably about 35 to about 60 weight-% one or more solvents, f) less than 5 weight-%, preferably less than 2 weight-%, more preferably less than 1 weight-% of one or more further additives such as leveling agents, surfactants and surface active compounds and curing catalysts, dyes and colorants, wherein the weight percentages of the UV-stabilizing component and the constituents of the composition-forming component add up to 100%, based on the total weight of the composition.

According to the present invention, the UV-stabilizing compounds and mixtures thereof described above are used by incorporation into curable compositions and cured silicon compound-containing compositions. Said compositions comprising the above described UV-stabilizing compounds and mixtures thereof are coating compositions defined as hardcoats or topcoats.

Preferably, the UV-stabilizing compounds or mixtures thereof according to the invention as described above are incorporated into UV-curable acrylic coating compositions. The coating compositions are defined as coatings comprising the UV-stabilizing compounds and mixtures thereof and substantially transparent matrix composition. Generally, the matrix material contains acrylics, urethanes, melamines, or mixtures thereof. U.S. patent application Ser. No. 08/699,254, herein incorporated by reference, also describes coating compositions.

The following examples illustrate the production of the UV stabilizer compounds according to the present invention, and their application in the preparation of curable compositions and cured compositions.

EXAMPLES

The "BTMR mixture" according to the invention is obtained in a one-step synthesis reaction by mixing 1 equivalent of 2-methyl resorcinol and a mixture of 1 equivalent of benzoyl chloride and 1 equivalent of toluoyl chloride in the presence of zinc dichloride ($ZnCl_2$) as described in Example 1. The above-mentioned one-step synthesis reaction can be represented as follows:

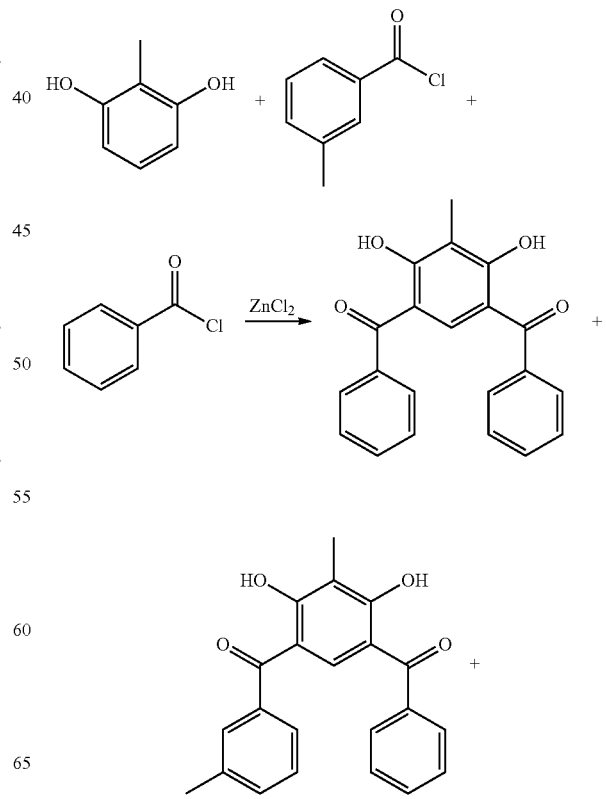

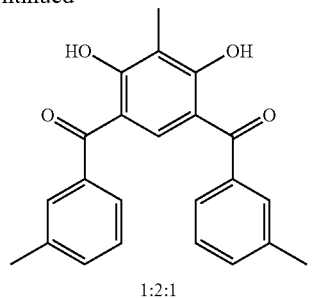

1:2:1 to As depicted above, the BTMR mixture is expected to have a molar ratio of DBMR to BTMR to DTMR of 1:2:1. Results may vary from this ideal ratio depending on the reaction conditions and work-up conditions chosen.

Example 1

Synthesis of BTMR-Based Mixture

In a 1 liter 3-neck flask equipped with a KPG stirrer, a dropping funnel, condenser with solvent trap (Bartlett trap) and a dry nitrogen line, 90 ml of technical toluene were introduced together with 38.3 g (308 mmol) of 2-methyl resorcinol. Under inert atmosphere the mixture was heated with a heating mantle to 90° C. The funnel was equipped with a mixture of 45.5 g (324 mmol) benzoyl chloride and 50.0 g (324 mmol) of m-toluoyl chloride. The chloride mixture was slowly added to maintain a gentle evolution of HCl gas. After full addition of the mixture and ceasing of the gas formation, the reaction mixture was allowed to cool down to room temperature.

In a second reaction flask 6.3 g (46.2 mmol) zinc chloride were introduced. The reaction mixture of the first flask was transferred, before the reaction flask was heated to 150 ° C. The solvent was removed under vacuum (~40 mbar) and collected in the solvent trap. After removal of the solvent the mixture was heated to 150° C. for 2 h. In the following the reaction mixture was cooled to 80° C., before 100 ml toluene were added.

The warm solution was washed with HCl-solution (1 wt-%) and subsequently twice with saturated NaCl solution. The organic layer was poured on 1 L methanol. The mixture was cooled in an ice bath, before the formed precipitate was filtered, rinsed with additional methanol to yield 75 g of a reddish solid.

The crude product was recrystallized from 2-butanol to obtain 76 g (72%) of a BTMR-based mixture consisting of DBMR:BTMR:DTMR with a molar ratio 22:52:26 (i.e. 0.85:2:1)

Preparation of Test Panels

For the investigation of adhesion, scratch resistance or weathering coated polycarbonate (PC) test panels were prepared according to the following procedure:

TABLE 1

Formulation details for the preparation of test panels: Ratio of components by weight-parts

| Formulation | A | B | C | D |
|---|---|---|---|---|
| Product | UV Hardcoat | | UV Hardcoat | |
| | with SDBR | with BTMR | with SDBR | with BTMR |
| Aliphatic urethane hexaacrylate | 32.4 | 32.4 | 32.4 | 32.4 |
| Methoxypropanol | 55.3 | 53.7 | 58.3 | 55.8 |
| Methacrylate functionalized nano silica particles | 4.12 | 4.12 | 4.12 | 4.12 |
| 1,6-hexanediol diacrylate | 4.13 | 4.13 | 4.13 | 4.13 |
| SDBR | 2.75 | 0 | 5.45 | 0 |
| "BTMR mixture" (molar ratio of DBMR to BTMR to DTMR 0.85:2:1) (of example 1) | 0 | 1.69 | 0 | 3.39 |
| 2,4,6-Trimethyl-benzoyldiphenyl-phosphine-oxide | 1.20 | 1.20 | 1.20 | 1.20 |
| Sebacic acid bis(1-octyloxy-2,2,6,6-tetramethyl-piperidine-4-yl) ester | 0.40 | 0.40 | 0.40 | 0.40 |
| silicone polyether acrylate | 0.04 | 0.04 | 0.04 | 0.04 |
| sum | 100.0 | 97.3 | 105.6 | 101.0 |
| solids | 45% | 45% | 45% | 45% |
| Formulation | E | F | G | H |
| Product | UV Hardcoat | | UV Hardcoat | |
| | with SDBR | with BTMR | with SDBR | with BTMR |
| Aliphatic urethane hexaacrylate | 34.5 | 34.5 | 34.5 | 34.5 |
| Aliphatic urethane diacrylate | 6.49 | 6.49 | 6.49 | 6.49 |
| Methoxypropanol | 43.1 | 43.1 | 43.1 | 43.1 |
| Methacrylate functionalized nano silica particles | 2.48 | 2.48 | 2.48 | 2.48 |
| 1.6-hexanediol diacrylate | 2.48 | 2.48 | 2.48 | 2.48 |
| Trimethylolpropantriacrylate | 4.63 | 4.63 | 4.63 | 4.63 |

TABLE 1-continued

Formulation details for the preparation of test panels:
Ratio of components by weight-parts

| | | | | |
|---|---|---|---|---|
| SDBR | 3.61 | 0 | 7.22 | 0 |
| BTMR mixture (molar ratio 0.85:2:1) of example 1 | 0 | 2.39 | 0 | 4.78 |
| 1-Hydroxy-cyclohexyl-phenyl-ketone | 1.70 | 1.70 | 1.70 | 1.70 |
| Bis(2,4,6-trimethylbenzoyl)-phenylphosphineoxide | 0.44 | 0.44 | 0.44 | 0.44 |
| Sebacic acid bis(1-octyloxy-2,2,6,6-tetramethylpiperidine-4-yl) ester | 0.53 | 0.53 | 0.53 | 0.53 |
| Silicone polyether acrylate | 0.034 | 0.034 | 0.034 | 0.034 |
| sum | 100.0 | 98.8 | 103.6 | 101.2 |
| solids | 56% | 56% | 56% | 56% |

Step A): The formulations A-H were blended according to Table 1 in an opaque PP (polypropylene) bottle. The ingredients were mixed by shaking the bottle. The formulation was stored at room temperature.

Step B): The coating was applied by flow coating on PC panels (Makrolon AL2647; 25×10 cm$^2$; 3.2 mm thickness)

Step C): A flash-off at ambient temperature was done for 2 mins.

Step D): The coated parts were transferred to a convection oven and stored for 5 min at 75° C.

Step E): After removal from the oven the panel was directly transferred to UV conveyor belt (UV conveyor belt: IST-Metz; 1 undoped Medium pressure Hg-Lamp; 120 W/cm) and cured according to the requirement: low energy (3 J/cm$^2$ @200 mW/cm$^2$ UVA$_{EIT}$) or high energy (5 J/cm$^2$ @300 mW/cm$^2$ UVA$_{EIT}$), wherein the surface power density was determined by a UV PowerPuck II from EIT (UVA range: 320-390 nm).

Xenon Weathering

For Xenon Weathering tests Q-Sun devices from Q-Lab were used. The established procedure for the sample handling and the parameter settings of the Xenon device are shown in the following tables:

TABLE 2

Xenon Weathering device Xe-3 HS from Q-Lab

| Device | Q-Lab Q-Sun, Xe-3 HS |
|---|---|
| Water Purity | Ion exchange (<0, 1 µS/cm) |
| Sample size | 5 × 5 cm$^2$ |
| Sample handling | Samples are rotated every 200 h on the tablet within the weathering device |

TABLE 3

Specification of Xenon weathering according to Volkswagen Spec. PV3929 and PV3930.

| Parameter | PV3929 | PV3930 |
|---|---|---|
| Intensity (@ 340 nm) | 0.6 W/m$^2$ | 0.5 W/m$^2$ |
| Filter | Daylight Q | Daylight Q |
| Black Standard Temp. | 90° C. | 65° C. |
| Chamber Temp. | 50° C. | 40° C. |
| Rel. Humidity | 20% | 70% |
| Cycle | — | 102 min dry; 18 min spray |
| Time vs. energy ratio | 1000 h = 1800 kJ | 1000 h = 1800 kJ |
| Outdoor eq. | 1500 h = 1 yr. eq. Kalahari | 1600 h = 1 yr. eq. Florida |

Performance of BTMR-Based Mixture of Example 1

The performance of UV hardcoats based on curable compositions according to the invention using UV stabilizers such as the BTMR-based mixture in comparison to UV hardcoats using the standard UV absorber 4,6-dibenzoyl-2-(3-triethoxysilylpropyl) resorcinol (SDBR) is described, focusing on adhesion, scratch resistance and weathering performance. Further, the solubility properties of BTMR and BTMR mixtures are demonstrated.

Example 2

Scratch and Abrasion Resistance

An UV cured hardcoat was used for the investigation of the dependence of the UV absorber concentration on the scratch and abrasion resistance of the coating system.

Equimolar amounts of both UV absorbers, SDBR and BTMR mixture, were used for the analysis. A standard concentration and a 2-fold amount of each UV absorber was used. The coated samples prepared from the different formulations were cured with a low and a high UV energy to investigate additionally the dependence of the performance on this parameter.

TABLE 4

Scratch and abrasion resistance of the UV hardcoat formulation with low and high loading of UV absorber (formulations A-D).

| | Low UV energy (3 J/cm$^2$ @ 0.2 W/cm$^2$) | | | |
|---|---|---|---|---|
| | Formulation A | Formulation B | Formulation C | Formulation D |
| Steel wool res.$^§$ | 2 | 0 | 5 | 4 |
| Taber abrasion$^$ | 7.8 | 6.8 | 13.2 | 7.8 |

TABLE 4-continued

Scratch and abrasion resistance of the UV hardcoat formulation with low and high loading of UV absorber (formulations A-D).

| | High UV energy (5 J/cm² @ 0.3 W/cm²) | | | |
|---|---|---|---|---|
| | Formulation A | Formulation B | Formulation C | Formulation D |
| Steel wool res.§ | 2 | 1 | 5 | 3 |
| Taber abrasions$ | 6.0 | 6.1 | 9.7 | 6.9 |

§steel wool grade: 0000. 10 double rubs with a 1 kg load; evaluation: 0: no scratch-5: strong scratches. $□-Haze (500 cycles, 500 g load, CS-10F (4th gen) wheels)

The obtained results are generally better for samples cured with high UV energy. At same energy and concentration level the observed steel wool resistance is better for the BTMR mixture of example 1 (molar ratio of DBMR to BTMR to DTMR 0:85:2:1) compared to SDBR. A similar result was obtained in Taber abrasion tests. SDBR shows a significant increase in the □-haze value when the concentration of the UVA is increased, whereas coatings using the BTMR mixture of example 1 don't show this effect. It was found that an increase of the SDBR concentration in UV coatings have an impact in the scratch and Taber abrasion resistance, whereas for the BTMR mixture of example 1 this effect was only observed in scratch tests with steel wool.

Example 3

Adhesion

The adhesion of two different UV hardcoat families was tested depending on the nature and concentration of the UV absorber used in the formulation. Both coating families (Formulation A-D and formulation E-H) with different concentrations of UV absorber (SDBR vs. BTMR mixture of example 1 ((molar ratio of DBMR to BTMR to DTMR 0.85:2:1) at 100% and 200% concentration) were applied on polycarbonate panels by flow coating. The cured samples were tested according to automotive adhesion test requirements using the Ford M80J6 specification for water immersion resistance (section 3.7.7) and the PSA D47 1309 specification for climate cycle resistance.

Watersoak adhesion was tested for the UV hardcoat formulations A, B, C and D using a tape pull test after 10 days (d) of water immersion of the test panels at 60° C. Kaercher adhesion after 5CF climate cycles (5 cycles in climate chamber: (85° C., 95% r.h., 15 h); (−20° C., 3 h); (85° C., dry, 6 h)) was measured on parts coated with Formulation E, F, G and H, respectively.

Results for both test series are shown in Table 5 and Table 6.

TABLE 5

Tape pull adhesion after 10 days watersoak of UVHC3000 with low and high loading of UV absorber

| UV curing condition | Low UV energy (3 J/cm² @ 0.2 W/cm²) | | | |
|---|---|---|---|---|
| UV Hardcoat | Formulation A | Formulation B | Formulation C | Formulation D |
| Watersoak adhesion$ | GT 0 | GT 0 | GT 0 | GT 0 |
| UV curing condition | High UV energy (5 J/cm² @ 0.3 W/cm²) | | | |
| UV Hardcoat | Formulation A | Formulation B | Formulation C | Formulation D |
| Watersoak adhesions$ | GT 0 | GT 0 | GT 0 | GT 0 |

$10 d watersoak @ 60° C.. Tape pull adhesion (GT0: no delamination-GT5: total delamination)

TABLE 6

Kaercher adhesion after climate cycles (5CF) of polycarbonate panels$ with low and high loading of UV absorber (Formulation E-H)

| Product | Formulation E | Formulation F | Formulation G | Formulation H |
|---|---|---|---|---|
| Kaercher adhesion§ | F0 | F0 | F0 | F0 |

$Coating conditions; Flow coating on AL2647; 2 min flash-off @ r.t.; 5 min @ 75° C. in convection oven; 4 J/cm² @ 0.32 W/cm².
§Climate cycles (5CF) on coated parts, followed by a cross-shaped scratch and hot water pressure test (1 min, 70° C., 70 bar water pressure); F0: no delamination-F5: total delamination.
*Weight percentage It can be seen that the adhesion is robust and there is no detrimental influence of the concentration of the UV absorber in the coating, even not on doubling the content of the UV-absorber when comparing the adhesion of Formulation F and Formulation H up to 200% by weight.

Example 4

Xenon-Weathering

Xenon weathering tests according PV3930 (Volkswagen Florida simulation) and PV3929 (Volkswagen Kalahari simulation) on polycarbonate panels coated with Formulation F (100% BTMR mix (ex. 1) concentration), formulation H (200% BTMR mix concentration) and two intermediate concentrations of BTMR mix UV absorber, 120% and 150%, under standard coating conditions and a coating thickness range of 10-12 μm revealed no significant difference in the weathering performance. Regardless of the UV absorber concentration the evolution of μ-cracking, adhesion, haze etc. is similar for all coatings.

A different result was obtained for low coating thickness. At a layer thickness around 6 μm a significant dependence of the yellowing and adhesion performance was observed in the PV3929 xenon weathering. Higher UV absorber concentrations help to reduce the tendency of yellowing and loss of adhesion. The results are summarized in Table 7 and Table 8.

TABLE 7

Yellowness Index evolution of Formulation F, H and two intermediate concentrations at 6 μm with increasing BTMR mixture (ex. 1) concentration in PV3929 xenon weathering.

| BTMR mix. Concentration | initial | 1 yr. eq.* | 2 yrs. eq. | 3 yrs. eq. |
|---|---|---|---|---|
| 100% = Formulation F | −2.26 | −1.82 | 0.27 | 16.29 |
| 120% | −2.25 | −1.94 | −0.27 | 5.88 |
| 150% | −2.25 | −1.81 | −0.28 | 3.34 |
| 200% = Formulation H | −2.32 | −1.65 | −0.62 | 1.05 |

*1 yr. eq. = 1500 h in PV3929

TABLE 8

Adhesion evolution of Formulation F, H and two intermediate concentrations at 6 μm with increasing BTMR mixture (ex. 1) concentration in PV3929 xenon weathering.

| BTMR mix. (ex. 1) concentration | 1 yr. eq.* | 2 yrs. eq. | 3 yrs. eq. |
|---|---|---|---|
| 100% = Formulation F | 0 | 0 | 5 |
| 120% | 0 | 0 | 2 |
| 150% | 0 | 0 | 1 |
| 200% = Formulation H | 0 | 0 | 1 |

*1 yr. eq. = 1500 h in PV3929

Example 5

Solubility of BTMR Product Mixtures

Solubility Tests

To determine the solubility of resorcinol products, the following procedure was used:

Material:
Preparation of the BTMR-based 0.9:1:1 mixture:
8.38 g of the synthesized "BTMR mixture" as in Example 1 (molar ratio of DBMR to BTMR to DTMR 0:85:2:1, i.e. a mixture of 5.32 mmol DBMR, 12.52 mmol BTMR, 6.26 mmol DTMR); 2.00 g (6.05 mmol) DBMR; 2.17 g (6.05 mmol) DTMR were diluted in 50 ml 1-methoxy-2-propanol at 60° C. Afterwards the solvent was evaporated again in vacuum. The residual precipitate was mechanically mixed and a dry powder was obtained.

Procedure:
0.50 g of pre-dried product (45 min @75° C. in oven) was combined with 5.00 ml of solvent (4.03 g of 2-butanol or 4.60 g of 1-methoxy-2-propanol). The mixture was handled in an ultrasonic bath for 1 min and stored afterwards under constant climate (20° C.) for 24 h.

The overlying solution was transfused carefully with a pipette. The solid content of this solution was measured thermogravimetrically with a halogen moisture analyzer (Mettler Toledo). This test procedure was repeated three times.

TABLE 9

Solubility in 1-methoxy-2-propanol

| Product | Solid content | Solubility [g/l] in 1-methoxy-2-propanol | Average |
|---|---|---|---|
| Pure Methoxyprop. | 0.00% | — | — |
| BTMR mix. 0.85:2:1 (1)* | 6.96% | 64.0 | 61.3 g/l (±5.4 g/l) |
| BTMR mix. 0.85:2:1 (2)* | 5.98% | 55.0 | |
| BTMR mix. 0.85:2:1 (3)* | 7.05% | 64.8 | |
| BTMR mix. 0.9:1:1 (1) | 4.62% | 42.5 | 38.4 g/l (±4.0 g/l) |
| BTMR mix. 0.9:1:1 (2) | 3.76% | 34.6 | |
| BTMR mix. 0.9:1:1 (3) | 4.14% | 38.1 | |

*according to Example 1

TABLE 10

Solubility in 2-butanol

| Product | Solid content | Solubility [g/l] in 2-butanol | Average |
|---|---|---|---|
| Pure 2-butanol | 0.00% | — | — |
| BTMR mix. 0.85:2:1 mix. (1)* | 0.81% | 6.5 | 6.4 g/l (±4.0 g/l) |
| BTMR mix. 0.85:2:1 (2)* | 0.74% | 6.0 | |
| BTMR mix. 0.85:2:1 (3)* | 0.84% | 6.8 | |
| BTMR mix. 0.9:1:1 (1) | 0.80% | 6.4 | 6.8 g/l (±6.0 g/l) |
| BTMR mix. 0.9:1:1 (2) | 0.81% | 6.5 | |
| BTMR mix. 0.9:1:1 (3) | 0.93% | 7.5 | |

*according to Example 1

The solubility of different BTMR mixtures were compared to the solubility of the single components of the mixture as shown in Table 11.

TABLE 11

Solubility values at 20° C. depending on product ratios of symmetrical and unsymmetrical diaroyl-methylresorcinols

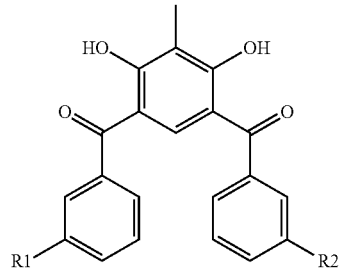

| $R_1 = R_2 = H$ DBMR | $R^1 = H$, $R^2 = Me$ BTMR | $R_1 = R_2 = Me$ DTMR | Solubility in 1-Methoxy-2-propanol | Solubility in 2-butanol |
|---|---|---|---|---|
| 1 | 0 | 0 | 4 g/l | <1 g/l |
| 0.22 | 0.52 | 0.26 | 61 g/l | 6 g/l |
| 0.31 | 0.34 | 0.34 | 38 g/l | 7 g/l |
| 0 | 0 | 1 | 15 g/l | 1 g/l |

It was found that both a 0.85:2:1 mixture and a 0.9:1:1 mixture of DBMR, BTMR and DTMR shows improved solubility over the pure symmetrical di-benzoyl DBMR and even the pure bi-toluoyl derivative DTMR. The 1:2:1 mixture DBMR, BTMR and DTMR like in to example 1 shows the highest solubility, certainly due to the increased amount of pure BTMR product in this mixture.

High concentrations of the prior art UV absorber SDBR in coating formulation reduce the scratch resistance of the coating, whereas using BTMR or BTMR-based mixtures the coating properties are less negatively affected.

Due to good solubility of BTMR and BTMR-based mixtures, higher loadings in the coating formulations without harming the scratch and adhesion properties are possible which help to extend the weathering performance at low coating thickness.

We claim:

1. A curable composition comprising (I) at least one compound of the formula (1):

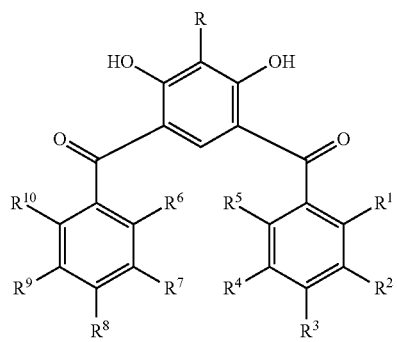

wherein R is C1-C10 alkyl, and $R^1$-$R^{10}$ each are independently selected from the group consisting of hydrogen and C1-C10 alkyl, with the proviso that at least one of $R^1$-$R^{10}$ is C1-C10 alkyl, and wherein the substitution patterns formed by the residues $R^1$-$R^5$ and $R^6$-$R^{10}$ on each of the aromatic rings are different from each other; and (II) a) one or more curable organic monomers, one or more curable organic polymers or mixtures thereof;
b) optionally one or more photoinitiators;
c) optionally one or more further light stabilizers;
d) optionally one or more silica compounds;
e) optionally one or more solvents; and
f) optionally one or more further additives.

2. The curable composition according to claim 1, wherein R is methyl and $R^1$-$R^{10}$ are each independently selected from the group consisting of hydrogen and methyl, with the proviso that at least one of $R^1$-$R^{10}$) is methyl.

3. The curable composition according to claim 1, wherein at least one compound of the formula (1) is represented by the formula (2):

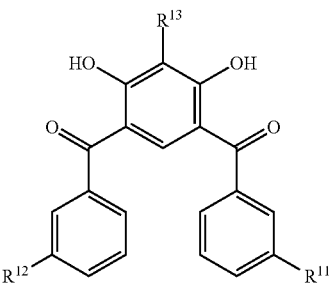

wherein $R^{13}$ is C -C10 alkyl and $R^{11}$ and $R^{12}$ are selected from hydrogen and C1-C10 alkyl, with the provisos that at least one of $R^{11}$ and $R^{12}$ is C1-C10 alkyl and that $R^{11}$ and $R^{12}$ are different from each other.

4. The curable composition according to claim 3, wherein $R^{13}$ is methyl and $R^{11}$ and $R^{12}$ are selected from hydrogen and methyl, with the proviso that at least one of $R^{11}$ and $R^{12}$ is methyl.

5. The curable composition according to claim 1, further comprising at least one compound of formula (3):

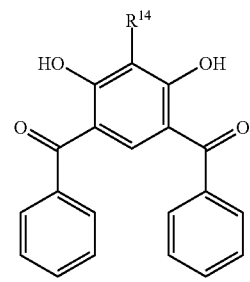

wherein $R^{14}$ is C1-C10 alkyl.

6. The curable composition according to claim 1, comprising a mixture comprising at least one compound of the formula (2):

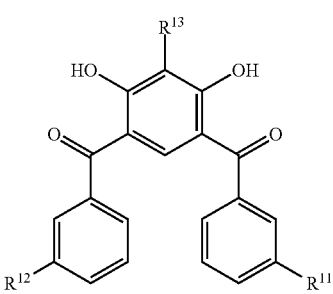

wherein $R^{13}$ is C1-C10 alkyl and $R^{11}$ and $R^{12}$ are selected from hydrogen and C1-C10 alkyl, with the provisos that at least one of $R^{11}$ and $R^{12}$ is C1-C10 alkyl and that $R^{11}$ and $R^{12}$ are different from each other, and at least one compound of formula (3):

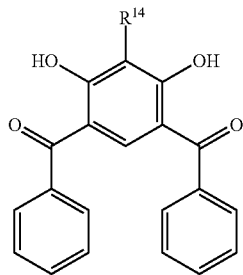

(3)

wherein $R^{14}$ is C1-C10 alkyl.

7. The curable composition according to claim 6, wherein $R^{13}$ and $R^{14}$ are methyl.

8. The curable composition according to claim 6, wherein $R^{13}$ and $R^{14}$ are methyl, and $R^{11}$ is hydrogen and $R^{12}$ is methyl.

9. The curable composition according to claim 1, further comprising
at least one compound of the formula (1) with R being C1-C10 alkyl, $R^1$-$R^{10}$ being each independently selected from the group consisting of hydrogen and C1-C10 alkyl and with the provisos that at least two groups of $R^1$-$R^{10}$ are C1-C10 alkyl groups and that the substitution patterns formed by the residues $R^1$-$R^5$ and $R^6$-$R^{10}$ on each of the aromatic rings are the same.

10. The curable composition according to claim 9, wherein the further comprised compound of the formula (1) is a compound of the formula (2) with
$R^{13}$ being C1-C10 alkyl and $R^{11}$ and $R^{12}$ being selected from C1-C10 alkyl, with the proviso that $R^{11}$ and $R^{12}$ are the same.

11. The curable composition according to claim 1, wherein the composition comprises dibenzoylacyl-2-methyl resorcinol (DBMR)

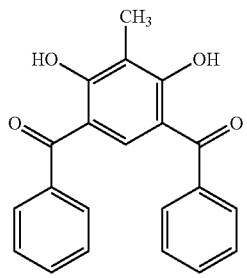

benzoyltoluoylacyl-2-methyl resorcinol (BTMR)

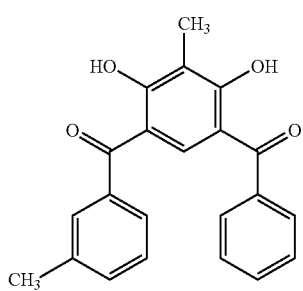 [SMILES: Cc1cccc(C(=O)c2cc(C(=O)c3ccccc3)c(O)c(C)c2O)c1]

and ditoluoylacyl-2-methyl resorcinol (DTMR)

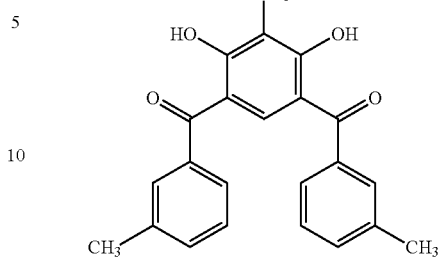

12. The curable composition according to claim 1, which is (i) a photo-curable composition, ii) a heat-curable composition, or (iii) a polymerizable composition.

13. The curable composition according to claim 1, further comprising at least one curable monomer.

14. The curable composition according to claim 1, further comprising at least one curable acrylate monomer and/or at least one aliphatic polyurethane acrylate monomer.

15. The curable composition according to claim 5, wherein $R^{14}$ is methyl.

16. The curable composition according to claim 9, wherein R is methyl and $R^1$-$R^{10}$ are each independently selected from the group consisting of hydrogen and methyl.

17. The curable composition of claim 10, wherein $R^{13}$, $R^{11}$ and $R^{12}$ are methyl.

18. The curable composition of claim 11, wherein the molar amount of each of DBMR and DTMR relative to the molar amount of BTMR, which is set to 2, is independently in the range of preferably 0.1 to 2.5.

19. A mixture of compounds comprising:
A) at least one compound of formula (1), wherein R is C1-C10 alkyl, and $R^1$-$R^{10}$ are each independently selected from the group consisting of hydrogen and C1-C10 alkyl, with the proviso that at least one of $R^1$-$R^{10}$ is C1-C10 alkyl and wherein the substitution patterns formed by the residues $R^1$-$R^5$ and $R^6$-$R^{10}$ on each of the aromatic rings are different from each other, and B) at least one compound of the formula (1), wherein R is C1-C10 alkyl, and $R^1$-$R^{10}$ are each independently selected from the group consisting of hydrogen and C1-C10 alkyl, and wherein the substitution patterns formed by the residues $R^1$-$R^5$ and $R^6$-$R^{10}$ on each of the aromatic rings are the same;
wherein formula (1) is of the formula

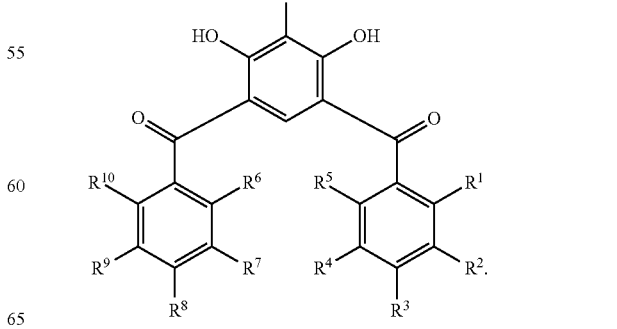

(1)

20. The mixture according to claim 18, comprising:

A) at least one compound of formula (1), wherein R is C1-C10 alkyl, and $R^1$-$R^{10}$ are each independently selected from the group consisting of hydrogen and C1-C10 alkyl, with the proviso that at least one of $R^1$-$R^{10}$ is C1-C10 alkyl and wherein the substitution patterns formed by the residues $R^1$-$R^5$ and $R^6$-$R^{10}$ on each of the aromatic rings are different from each other, and B) at least one compound of formula (3):

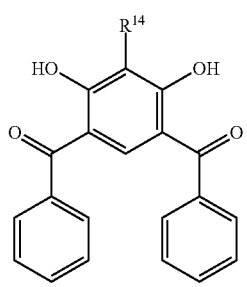

(3)

wherein $R^{14}$ is C1-C10 alkyl.

21. The mixture according to claim 19, the mixture comprising dibenzoylacyl-2-methyl resorcinol (DBMR)

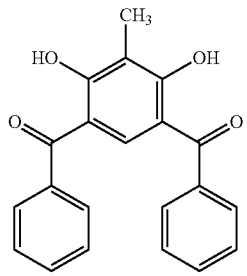

benzoyltoluoylacyl-2-methyl resorcinol (BTMR)

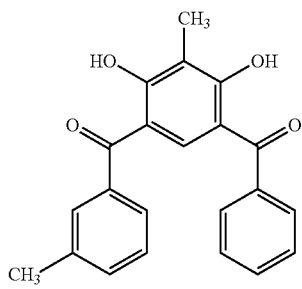

and ditoluoylacyl-2-methyl resorcinol (DTMR),

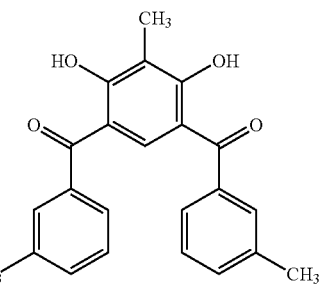

22. A process for the manufacture of the curable composition according to claim 1, comprising the steps of I) providing a UV stabilizing component consisting of one or more compounds of the formula (1):

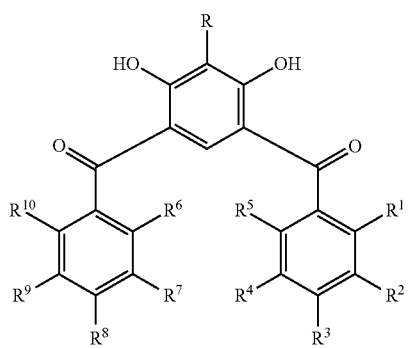

(1)

wherein R is C1-C10 alkyl, and $R^1$-$R^{10}$ each are independently selected from the group consisting of hydrogen and C1-C10 alkyl, with the proviso that at least one of $R^1$-$R^{10}$ is C1-C10 alkyl, and wherein the substitution patterns formed by the residues $R^1$-$R^5$ and $R^6$-$R^{10}$ on each of the aromatic rings are different from each other, and II) mixing the UV stabilizing component provided in step I) with a composition-forming component comprising
   a) one or more curable organic monomers, one or more curable organic polymers or mixtures thereof,
   b) optionally one or more photoinitiators;
   c) optionally one or more further light stabilizers;
   d) optionally one or more silica compounds;
   e) optionally one or more solvents; and
   f) optionally one or more further additives.

23. The process according to claim 22, wherein at least one compound of the formula (1) is represented by the formula (2):

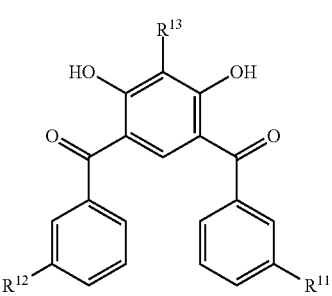

(2)

wherein R$^{13}$ is C1-C10 alkyl and R$^{11}$ and R$^{12}$ are selected from hydrogen and C1-C10 alkyl, with the provisos that at least one of R$^{11}$ and R$^{12}$ is C1-C10 alkyl and that R$^{11}$ and R$^{12}$ are different from each other.

24. The process according to claim 22, wherein the UV stabilizing component consists of a mixture of one or more compounds of the formula (2):

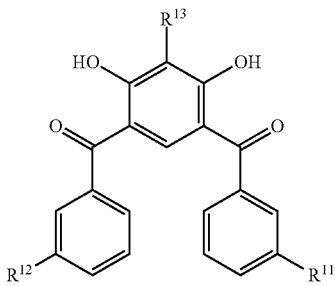

(2)

wherein R$^{13}$ is C1-C10 alkyl and R$^{11}$ and R$^{12}$ are selected from hydrogen and C1-C10 alkyl, with the provisos that at least one of R$^{11}$ and R$^{12}$ is C1-C10 alkyl and that R$^{11}$ and R$^{12}$ are different from each other, one or more compounds of the formula (2), wherein R$^{13}$ is C1-C10 alkyl and R$^{11}$ and R$^{12}$ are selected from C1-C10 alkyl, with the proviso that R$^{11}$ and R$^{12}$ are the same, and one or more compounds of formula (3):

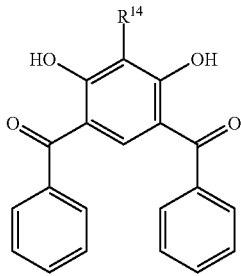

(3)

wherein R$^{14}$ is C1-C10 alkyl.

25. The process according to claim 22, wherein the UV stabilizing component consists of a mixture of dibenzoylacyl-2-methyl resorcinol (DBMR)

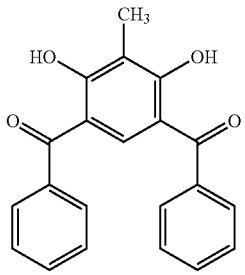

benzoyltoluoylacyl-2-methyl resorcinol (BTMR)

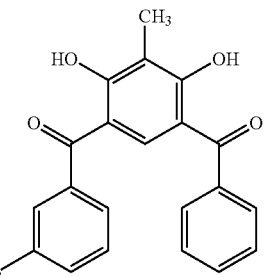

and dituoluoylacyl-2-methyl resorcinol (DTMR)

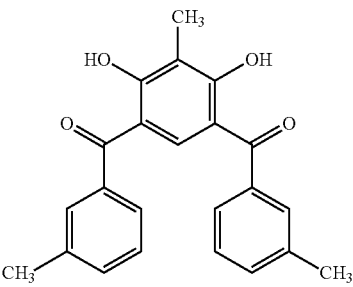

26. The process according to claim 22, wherein the UV stabilizing component is provided by the reaction of a 2-(C1-C10 alkyl) resorcinol and at least two different aroyl halides of the general structure (4)

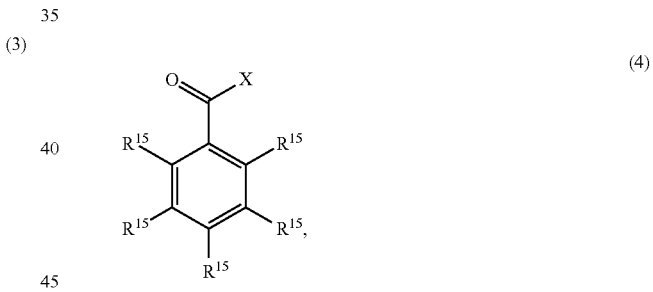

(4)

with X=Cl, Br and R$^{15}$ is each independently selected from hydrogen or C1-C10 alkyl, optionally followed by a purification step.

27. The process according to claim 26, wherein two aryloyl halides of the general structure (4) are reacted with a 2-(C1-C10 alkyl) resorcinol, with each R$^{15}$ being hydrogen for the first aryloyl halide and one R$^{15}$ of the second aryloyl being C1-C10 alkyl, and the remaining R15 groups of the second aryloyl halide being hydrogen.

28. The process according to claim 22, wherein the UV stabilizing component (I) is present in an amount of about 1 to about 15 weight-%, and the composition-forming component (II) comprises
  a) about 27 to 60 weight-% of one or more curable organic monomers, one or more curable organic polymers, or
  b) 0 to about 5 weight-% of one or more photoinitiators,
  c) 0 to about 2 weight-% of one or more further light stabilizers,
  d) 0 to about 10 weight-% of one or more silica compounds,
  e) 0 to about 80 weight-% of one or more solvents, f) less than 5 weight-% of one or more further additives,
wherein the weight percentages of the UV-stabilizing component (I) and the constituents of the composition-forming component (II) add up to 100%, based on the total weight of the composition.

* * * * *